United States Patent
Nakamura et al.

(10) Patent No.: US 8,048,218 B2
(45) Date of Patent: Nov. 1, 2011

(54) COATING, AQUEOUS COATING MATERIAL AND PROCESS FOR PRODUCING COATING USING THE SAME, AND COATED ARTICLE WITH COATING

(75) Inventors: Junichi Nakamura, Toyohashi (JP); Motomi Tanaka, Toyohashi (JP); Mina Nomura, Yokohama (JP); Hiroki Ishii, Seto (JP); Yasutaka Doi, Toyohashi (JP); Takahiro Mukuda, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 921 days.

(21) Appl. No.: 10/588,318

(22) PCT Filed: Feb. 2, 2005

(86) PCT No.: PCT/JP2005/001489
§ 371 (c)(1),
(2), (4) Date: Dec. 26, 2006

(87) PCT Pub. No.: WO2005/075583
PCT Pub. Date: Aug. 18, 2005

(65) Prior Publication Data
US 2007/0129478 A1  Jun. 7, 2007

(30) Foreign Application Priority Data

Feb. 4, 2004  (JP) ................... 2004-028437
Jun. 3, 2004  (JP) ................... 2004-165711
Sep. 9, 2004  (JP) ................... 2004-262361

(51) Int. Cl.
*C04B 14/04* (2006.01)

(52) U.S. Cl. ....................................... 106/481
(58) Field of Classification Search ............ 106/481
See application file for complete search history.

(56) References Cited

U.S. PATENT DOCUMENTS 4,435,219 A * 3/1984 Greigger .................. 106/287.16
2002/0134026 A1 * 9/2002 Fujii et al. .................... 51/295

FOREIGN PATENT DOCUMENTS

| JP | 53 34141 | 9/1978 |
|---|---|---|
| JP | 1 41180 | 9/1989 |
| JP | 3-106948 | 5/1991 |
| JP | 4 23857 | 1/1992 |
| JP | 5 96234 | 4/1993 |
| JP | 9 165554 | 6/1997 |
| JP | 10 168393 | 6/1998 |
| JP | 11 116885 | 4/1999 |
| JP | 2001011379 A * | 1/2001 |
| JP | 2004 67749 | 3/2004 |
| JP | 2004 149668 | 5/2004 |

* cited by examiner

*Primary Examiner* — Jennifer K. Michener
*Assistant Examiner* — Eli Mekhlin
(74) *Attorney, Agent, or Firm* — Oblon, Spivak, McClelland, Maier & Neustadt, L.L.P.

(57) ABSTRACT

A coating comprising a polymer (I)-containing coating component and colloidal silica (II) of 60 nm or less average particle diameter, wherein 0.5 to 20 parts by mass, in terms of solid content, of colloidal silica (II) is contained per 100 parts by mass of polymer (I) and wherein the area of colloidal silica exposed from the surface of the coating occupies 35% or more based on the coating surface. This coating exhibits excellent antifouling performance and excels in transparency, weather resistance, water resistance, and elongation degree.

8 Claims, No Drawings

COATING, AQUEOUS COATING MATERIAL AND PROCESS FOR PRODUCING COATING USING THE SAME, AND COATED ARTICLE WITH COATING

TECHNICAL FIELD

The present invention relates to a coating, an aqueous coating material, a process for producing a coating using the aqueous coating material, and a coated article with the coating.

BACKGROUND ART

In recent years, in the field of paints, transformation from organic solvent-based paints to water-based paints is promoted from the view points of environmental protection and safety-hygiene. However, water-based paints are on a lower level with coating performance of weather resistance, water resistance, freeze-thaw resistance, and particularly stain-resistance comparing with organic solvent-based paints. Therefore, it is current that there are many problems to be solved.

Development of water-based paints and development of laminating methods of coatings directed to a solution of these problems have been performed in various ways. For example, as resins for water-based paints, emulsions of acrylic resins by emulsion polymerization are attracted attention because the obtained coating has characteristics having relatively good properties such as weather resistance. In addition, a method such that laminate coatings are performed with imparting properties to under coatings, intermediate coatings and top coatings respectively by using water-based emulsions to impart coating performance such as stain-resistance to the entire laminate material has been developed.

Technical methods of stain-resistant improvement include (i) a method of raising the hardness of a coating (glass transition temperature of a resin (Tg) is raised), (ii) a method to hydrophilize a coating surface to impart a faculty of self-purification to wash away a pollutant with rain, and (iii) a method to restrain adhering electrostatic pollution by regulating electrostatic property, and so on.

However, when a glass transition temperature is raised and the hardness of a coating is raised as in method (i), film formation characteristics deteriorate and problems such as occurring of cracks in winter (freezing damage characteristics) happen. In addition, large improvement of stain-resistance is difficult. In a method to hydrophilize a coating surface as in method (ii), there is a problem that weather resistance deteriorates as for hydrophilizing by monomer compositions. Further, as for the addition of materials such as surfactants, water resistance deteriorates, and there also has a problem in continuance of stain-resistant effect. In a method to regulate electrostatic property as in method (iii), addition of an antistatic agent gives bad influence for weather resistance and water resistance, and there also has a problem in the durability of the effect.

A method to contain inorganic materials is known as one of methods to solve the above problems and to improve properties of water-based paints. For example, in Patent reference 1, a coating composition in which colloidal silica is incorporated into a water-based emulsion by copolymerizing vinyl silanes and acrylic monomers is proposed, and has characteristics excellent in heat resistance, water resistance, and adhesion of a coating.

However, this coating composition needs large contents of colloidal silica of 500-20000 parts by mass in solid content for 100 parts by mass in solid content of the water-based emulsion. When large contents of colloidal silica are used, there have problems that transparency and weather resistance of the coating, storage stability of the coating composition, and coating workability become inferior.

On the contrary, Patent references 2 and 3 disclose that relatively small contents of colloidal silica are used as essential components.

In Patent reference 2, a flame-retardant paint material containing 100 parts by mass of a polyorgano siloxane-based graft copolymer emulsion in which 10-90 mass % of a unsaturated vinyl monomer is graft-copolymerized for polyorgano siloxane, and 1-50 parts by mass of colloidal silica is proposed. The above flame-retardant paint material has characteristics excellent in flame retardancy, extensibility, adhesiveness, temperature sensitivity, moisture permeability, and stain-resistance of the coating.

However, this paint material has problems of low stain-resistance with insufficient hydrophilic property, transparency, and hardness of the coating, because of containing large contents of a water-repellent silicone component which is 52 parts by mass or more of a polyorgano siloxane component for 100 parts by mass in solid content of the polyorgano siloxane-based graft block copolymer emulsion.

In Patent reference 3, an aqueous coating composition containing 100 parts by mass of a polyorgano siloxane-based graft copolymer emulsion and 1-300 parts by mass of colloidal silica is proposed. The aqueous coating composition is excellent in storage stability, and a coating has characteristics excellent in hardness, water resistance, and stain-resistance. However, lowering pollution by a further hydrophilization of the coating is requested although stain-resistance is largely improved as compared to the coating comprising the paint material described in Patent reference 2.

In addition, in Patent references 4 and 5, and so on, at a case of surface coating of cement-type materials, a method to prevent pollution adhesion from static electricity and to impart stain-resistance to a coating is proposed by preventing static electricity retention of a whole laminated material which has a multi-layer structure of an under coating, an intermediate coating, and a top coating, and each of all layers contains a silicate or silica sol.

However, when either one layer of the under coating, the intermediate coating or the top coating was a coating only with a resin, a static electricity retention was generated to cause a problem of pollution adhesion.

In addition, in Patent reference 6, an antifouling aqueous coating composition, which comprises an aqueous dispersion having a silicone structure containing phenyl group, a sulfosuccinic acid-type surfactant, a surfactant having alkylene oxide group and colloidal inorganic particles (colloidal silica), is proposed. However, in the antifouling aqueous coating composition described in Patent reference 6, stain-resistance in a satisfactory level has not achieved.

Patent reference 1: Japanese Examined Patent Application, Second Publication No. H1-41180
Patent reference 2: Japanese Unexamined Patent Application, First Publication No. H4-23857
Patent reference 3: Japanese Unexamined Patent Application, First Publication No. H9-165554
Patent reference 4: Japanese Examined Patent Application, Second Publication No. S53-34141
Patent reference 5: Japanese Unexamined Patent Application, First Publication No. H5-96234
Patent reference 6: Japanese Unexamined Patent Application, First Publication No. 2004-149668

DISCLOSURE OF INVENTION

Problem to be Solved by the Invention

The present invention was made to solve the above problems. The object of the present invention is to provide a coating excellent in stain-resistance and transparency, weather resistance, and elongation.

Means for Solving the Problem

A coating of the present invention comprises a coating component containing polymer (I) and colloidal silica (II) having an average particle size of 60 nm or less, wherein colloidal silica (II) is contained with 0.5-20 parts by mass in solid content for 100 parts by mass of polymer (I) and the area of colloidal silica exposed at a coating surface occupies 35% or more of the coating surface.

In addition, an aqueous coating material of the present invention comprises polymer (I) containing 0.1-20 parts by mass of a radical polymerizable monomer unit containing hydrolysable silyl group (a) and 80-99.9 parts by mass of another copolymerizable monomer unit (b) (the total contents of (a) and (b) are 100 parts by mass), colloidal silica (II) having an average particle size of 60 nm or less, and at least one kind of an anionic surfactant selected from the group of the following (III), and a nonionic surfactant, wherein colloidal silica (II) is contained with 0.5-20 parts by mass in solid content for 100 parts by mass of polymer (I).

(III): Sulfate salts of polyoxyalkylene aryl ether, sulfate salts of polyoxyalkylene alkylaryl ether, formalin condensates of sulfate salts of polyoxyalkylene aryl ether, and formalin condensates of sulfate salts of polyoxyalkylene alkylaryl ether.

Further, another aqueous coating material of the present invention comprises polymer (I) containing 4-20 parts by mass of a radical polymerizable monomer unit containing hydrolysable silyl group (a) and 80-96 parts by mass of another copolymerizable monomer unit (b) (the total contents of (a) and (b) are 100 parts by mass), and colloidal silica (II) having an average particle size of 60 nm or less, wherein colloidal silica (II) is contained with 0.5-20 parts by mass in solid content for 100 parts by mass of polymer (I).

In addition, another aqueous coating material of the present invention comprises 0.5-20 parts by mass in solid content of colloidal silica (II) having an average particle size of 60 nm or less and 0.5-20 part by mass of an organic solvent having less than 0.8 of distribution coefficient of octanol/water.

A process for producing a coating of the present invention comprises applying the aqueous coating material according to any one of the above aqueous coating materials, wherein a coating comprises a coating component containing polymer (I) and colloidal silica (II) having an average particle size of 60 nm or less, in which colloidal silica (II) is contained with 0.5-20 parts by mass in solid content for 100 parts by mass of polymer (I) and the area of colloidal silica exposed at the coating surface occupies 35% or more of the coating surface.

Further, a coated article of the present invention comprises the above coating.

Effects of the Invention

According to the coating of the present invention, excellent stain-resistance is developed, the coating excellent in transparency, weather resistance, and coating elongation can be provided.

In addition, by applying the aqueous coating material of the present invention, the above coating can be formed.

The coated article having high stain-resistance, transparency, weather resistance and coating elongation can be provided by having the above described coating on a product.

BEST MODE FOR CARRYING OUT THE INVENTION

The coating of the present invention comprises a coating component containing polymer (I) and colloidal silica (II) having an average particle size of 1-60 nm, wherein colloidal silica (II) is contained with 0.5-20 parts by mass in solid content for 100 parts by mass of polymer (I) and the area of colloidal silica exposed at the coating surface occupies 35% or more of the coating surface.

The above coating component is an essential component which imparts characteristics such as film formability, weather resistance, water resistance, and freeze-thaw resistance to the coating, and the above colloidal silica is a component which imparts characteristics of stain-resistance and anti-static property, hardness, and weather resistance to the coating.

It is explained in detail as follow.

[Colloidal Silica]

According to the present invention, colloidal silica exists at a specific rate at the surface of the coating. In this condition, colloidal silica exposed and dispersed at the surface of the coating gives remarkable hydrophilic property to the coating so that self-purifying by rain is achieved. Further, colloidal silica particles come into contact at the coating surface each other so that the coating surface has conductivity and adhesion of pollution by static electricity is restrained. As a result, this coating shows excellent stain-resistance.

The content of colloidal silica in the whole coating is 0.5-20 parts by mass in solid content for 100 parts by mass of the polymer in the coating component. When this content is 0.5 part by mass or more, stain-resistance, water contact angle, and anti-static property of the coating can be improved. On the other hand, when this content is 20 parts by mass or less, stain-resistance, water contact angle, and anti-static property of the coating can be further improved without reducing transparency, weather resistance, water resistance, and freeze-thaw resistance (coating elongation) of the coating. In addition, when this content exceeds 20 parts by mass, whitening of the coating occurs. More preferred content of colloidal silica is 1-18 parts by mass.

The area of colloidal silica exposed to the coating surface occupies 35% or more of the coating surface area. When the exposed area of colloidal silica at the coating surface is less than 35%, satisfactory stain-resistance, water contact angle and anti-static property can not be obtained. The area is preferably 50% or more, more preferably 70% or more, and most preferably 90% or more.

The exposed area of colloidal silica at the coating surface in the present invention means an area got by image processing of a secondary electron image of a scanning electron micrograph of the coating surface. In addition, a distribution situation and an area size of the coating component which is not covered by colloidal silica can be determined in visual observation by using a secondary electron image of a scanning electron microscope. An example of software used for a specific electron microgram scan condition and image processing is shown as follows.

Electron Microgram

JSM6340F type field emission scanning electron microscope manufactured by JEOL Ltd.

Acceleration voltage: 2.5 kV

Magnification: 50,000 times/image processing analysis

Planetron Inc., Image-Pro Plus

Analysis target minimal area: 1e-5 μm²

It is considered that colloidal silica moves up by passing through particles of a polymer at the coating surface during film formation, resulting to form a film in the form of covering a particle of the polymer. Thus, about the surface morphology of the coating, a shape of the polymer segment that is not covered with colloidal silica reflects the shape of the polymer particle in the coating component, so that the shape is mainly in circular form, near in circular form, or the figure that the polymer particles agglomerate. In electron micrograms, when the contrast of these and colloidal silica is insufficient, it is difficult to obtain the result of image processing based on the actual situation. Thus, image processing after processing by software such as Photoshop® is effective to touch contrast to a digital picture of an electron micrograph.

In addition, as for the polymer segment that is not covered in the coating surface by colloidal silica, that diameter is 0-1 μm, and it is preferred that the polymer segment is distributed at the coating surface equally. When the exposing portion of the polymer particles that are not covered with colloidal silica is too wide, and the portion of the polymer exposing at the coating surface is unevenly distributed in one section of the coating, stain-resistance of the whole coating shows a tendency to deteriorate.

Further, it is preferable that the silicon density derived from colloidal silica in the outer layer of the coating is 10 atm % or more. When the silicon density is less than 10 atm %, stain-resistance, water contact angle, and anti-static property of the coating show a tendency to deteriorate.

The silicon density derived from colloidal silica in the outer layer of the coating can be measured with X-ray photoelectron spectroscopy. A specific example of a measurement condition of X-ray photoelectron spectroscopy is shown as follows.

X-ray photoelectron spectroscopy

ESCA LAB 220iXL manufactured by Vacuum Generators, Inc.

X-ray source: monochromatization Alkα, 200 W

Lens mode: Large XL mode

Pass Energy: 100 eV (wide scan)/20 eV (narrow scan)

The average particle size of colloidal silica (II) used in the present invention is 1-60 nm, preferably less than 40 nm, and more preferably less than 20 nm. When the particle size of colloidal silica is 60 nm or less, colloidal silica is easy to move up to the surface layer of the coating during the film formation. In the coating surface layer, film formation is performed so that colloidal silica fills up thickly the interstice of the polymer particles of the coating component and so that the polymer particles are coated, to result the polymer and colloidal silica or colloidal silica particles exist with chemical bonding or physical adsorption at the surface of the coating. As a result, high stain-resistance can be developed. In addition, when average particle sizes of colloidal silica exceed 60 nm, reflecting diffusion of incident light to the coating surface and transmitted light was caused so that problems such as whitening of the coating happen.

As colloidal silica, commercial products can be used and either one dispersed in water or one dispersed in an organic solvent can be applicable.

For example, for aqueous colloidal silica showing acidic property, commercial products such as "SNOWTEX OXS" (SiO₂ solid contents 10%), "SNOWTEX OS" (SiO₂ solid contents 20%), "SNOWTXEX O" (SiO₂ solid contents 20%), "SNOWTEX O-40" (SiO₂ solid contents 40%), "SNOWTEX OL" (SiO₂ solid contents 20%), "SNOWTEX OUP" (SiO₂ solid contents 15%) (manufactured by Nissan Chemical Industries, Ltd.), "ADELITE AT-20Q" (manufactured by ADEKA CORPORATION, SiO₂ solid contents 20%), "CATALOID SN" (manufactured by Catalysts & Chemicals Industries Co., Ltd., SiO₂ solid contents 20%), "SILICADOL-20A" (SiO₂ solid contents 20%) and "SILICADOL-20GA" (SiO₂ solid contents 20%) (manufactured by Nippon Chemical Industrial Co., Ltd.) are given.

For aqueous colloidal silica showing alkaline property, for example, commercial products such as "SNOWTEX XS" (SiO₂ solid contents 20%), "SNOWTEX 20" (SiO₂ solid contents 20%), "SNOWTEX 30" (SiO₂ solid contents 30%), "SNOWTEX 40" (SiO₂ solid contents 40%), "SNOWTEX 50" (SiO₂ solid contents 50%), "SNOWTEX C" (SiO₂ solid contents 20%), "SNOWTEX N" (SiO₂ solid contents 20%), "SNOWTEX S" (SiO₂ solid contents 30%), "SNOWTEX CM" (SiO₂ solid contents 30%), "SNOWTEX UP" (SiO₂ solid contents 20%), "SNOWTEX 20L" (SiO₂ solid contents 20%), "SNOWTEX XL" (SiO₂ solid contents 40%), (manufactured by Nissan Chemical Industries, Ltd.), "ADELITE AT-20" (SiO₂ solid contents 20%), "ADELITE AT-20N" (SiO2 solid contents 20%), "ADELITE AT-20A" (SiO₂ solid contents 20%), "ADELITE AT-30", "ADELITE AT-40", "ADELITE AT-50", "ADELITE AT-30A", "ADELITE AT-300", "ADELITE AT-300S" (manufactured by ADEKA CORPORATION), "CATALOID S-20L" (SiO₂ solid contents 20%), "CATALOID S-20H" (SiO₂ solid contents 20%), "CATALOID S-30L" (SiO₂ solid contents 30%), "CATALOID S-30H" (SiO₂ solid contents 30%), "CATALOID SI-30" (SiO₂ solid contents 30%), "CATALOID SI-40" (SiO₂ solid contents 40%), "CATALOID SI-50" (SiO₂ solid contents 47%), "CATALOID SI-350" (SiO₂ solid contents 30%), "CATALOID SI-500" (SiO₂ solid contents 20%), "CATALOID SI-45P" (SiO₂ solid contents 40%), "CATALOID SI-80P" (SiO₂ solid contents 40%), "CATALOID SA" (SiO₂ solid contents 30%), "CATALOID SC-30" (SiO₂ solid contents 30%) (manufactured by Catalysts & Chemicals Industries Co., Ltd.), "SILICADOL-20" (SiO₂ solid contents 20%), "SILICADOL-30" (SiO₂ solid contents 30%), "SILICADOL-40" (SiO₂ solid contents 40%), "SILICADOL-30S" (SiO₂ solid contents 30%), "SILICADOL-20AL" (SiO₂ solid contents 20%), "SILICADOL-20A" (SiO₂ solid contents 20%), "SILICADOL 20B" (SiO₂ solid contents 20%), "SILICADOL-20G" (SiO₂ solid contents 20%), "SILICADOL-20GA" (SiO₂ solid contents 20%), and ammonium silicate (SiO₂ solid contents 40%) (manufactured by Nippon Chemical Industrial Co., Ltd.) are given.

For cationic colloidal silica, "SNOWTEX AK" (manufactured by Nissan Chemical Industries, Ltd., SiO₂ solid contents 19%) and "SILICADOL-20P" (manufactured by Nippon Chemical Industrial Co., Ltd., SiO₂ solid contents 20%) are given.

In the present invention, these colloidal silica can be used alone or in combination.

For colloidal silica (II) used in the present invention, surface treatment by silane compounds shown in the following general formula (1) can be applied.

$$SiR^1{}_{n+1}(OR^2)_{3-n} \qquad (1)$$

Wherein, $R^1$ represents a hydrogen atom or a hydrocarbon group having 1-10 carbon atoms; $R^2$ represents hydrogen atom or hydrocarbon group having 1-10 carbon atoms which can include an ether bond; and n represents an integer of 0, 1, or 2.

For specific examples of the silane compounds shown in the general formula (1), trimethoxy silane, dimethoxy silane, dimethoxy dimethyl silane, methoxy trimethyl silane, triethoxy silane, diethoxy methyl silane, dimethyl ethoxy silane, phenyl trimethoxy silane, dimethoxy phenyl silane, phenyl triethoxy silane, diethoxy phenyl silane, and the like can be given. These can be used alone or in combination. Among these, trimethoxy methyl silane is particularly preferable.

As a method of surface treatment of colloidal silica by a silane compound, a method that colloidal silica and at least one kind of a silane compound selected from the above silane compounds are added to a water-based resin dispersion containing polymer (I), and stirring with an optional time is performed at the temperature of room temperature to 100° C. is given.

In addition, alternatively, a method to add colloidal silica, that was surface-treated with a silane compound, and that is obtained in advance by stirring colloidal silica and at least one of the above silane compounds with an optional time at the temperature of room temperature to 100° C., into the water-based resin dispersion of polymer (I) is given. However, it is not particularly limited to this method.

The content of the silane compound which is used when surface treatment of colloidal silica is proceeded is preferably 1-60 parts by mass for 100 parts by mass in solid content of colloidal silica. When this content is 1 part by mass or more, weather resistance of the coating is improved, and when it is 60 parts by mass or less, weather resistance of the coating is further improved without reducing storage stability of colloidal silica and stain-resistance and water resistance of the coating. More preferred content is 5-40 parts by mass.

[Coating Component]

The coating component comprises polymer (I) as a main component.

For polymer (I), a polyester resin, a polyurethane resin, an acrylic resin, an acrylic silicone resin, a fluorine resin, and so on are given, and among these, an acrylic resin and an acrylic silicone resin are preferable from a viewpoint of stain-resistance, weather resistance, water resistance, and freeze-thaw resistance of the coating, and an acrylic silicone resin is the most preferable.

In the present invention, for monomers used for polymer (I), for example, vinyl silanes such as vinyl methyldimethoxy silane, vinyl trimethoxy silane, vinyl triethoxy silane, vinyl methyldichloro silane, and vinyl trichloro silane; acryloyloxy alkyl silanes such as γ-acryloyloxy ethylmethyldimethoxy silane, γ-acryloyloxy ethyltrimethoxy silane, γ-acryloyloxy ethyltriethoxy silane, γ-acryloyloxy propylmethyldimethoxy silane, γ-acryloyloxy propyltrimethoxy silane, γ-acryloyloxy propyltriethoxy silane, γ-acryloyloxy ethylmethyldichloro silane, γ-acryloyloxy ethyltrichloro silane, γ-acryloyloxy propylmethyldichloro silane, and γ-acryloyloxy propyltrichloro silane; methacryloyloxy alkyl silanes such as γ-methacryloyloxy ethylmethyldimethoxy silane, γ-methacryloyloxy ethyltrimethoxy silane, γ-methacryloyloxy ethyltriethoxy silane, γ-methacryloyloxy propylmethyldimethoxy silane, γ-methacryloyloxy propyltrimethoxy silane, γ-methacryloyloxy propyltriethoxy silane, γ-methacryloyloxy ethylmethyldichloro silane, γ-methacryloyloxy ethyltrichloro silane, γ-methacryloyloxy propylmethyldichloro silane, and γ-methacryloyloxy propyltrichloro silane; alkyl (meth)acrylates having alkyl group having 1-18 carbon atoms such as methyl (meth)acrylate, ethyl (meth)acrylate, n-propyl (meth)acrylate, i-propyl (meth)acrylate, n-butyl (meth)acrylate, i-butyl (meth)acrylate, sec-butyl (meth)acrylate, t-butyl (meth)acrylate, n-amyl (meth)acrylate, i-amyl (meth)acrylate, n-hexyl (meth)acrylate, 2-ethylhexyl (meth) acrylate, n-octyl (meth)acrylate, nonyl (meth)acrylate, decyl (meth)acrylate, dodecyl (meth)acrylate, lauryl (meth)acrylate and stearyl (meth)acrylate; cycloalkyl (meth)acrylates such as cyclohexyl (meth)acrylate and p-t-butylcyclohexyl (meth)acrylate; radical polymerizable monomers containing hydroxyl group such as 2-hydroxyethyl (meth)acrylate, 2-(3-)hydroxypropyl (meth)acrylate, 4-hydroxybutyl (meth)acrylate, and glycerol mono(meth)acrylate; (meth)acrylates containing polyalkylene oxide group such as hydroxypolyethylene oxide mono(meth)acrylate, hydroxypolypropylene oxide mono(meth)acrylate, hydroxy(polyethylene oxide-polypropylene oxide) mono(meth)acrylate, hydroxy(polyethylene oxide-propylene oxide) mono(meth)acrylate, hydroxy(polyethylene oxide-polytetramethylene oxide) mono(meth)acrylate, hydroxy(polyethylene oxide-tetramethylene oxide) mono(meth)acrylate, hydroxy(polypropylene oxide-polytetramethylene oxide) mono(meth)acrylate, hydroxy(polypropylene oxide-polytetramethylene oxide) mono(meth)acrylate, methoxy polyethylene oxide mono (meth)acrylate, lauloxy polyethylene oxide mono(meth) acrylate, stearoxy polyethylene oxide mono(meth)acrylate, allyloxy polyethylene oxide mono(meth)acrylate, nonylphenoxy polyethylene oxide mono(meth)acrylate, nonylphenoxy polypropylene oxide mono(meth)acrylate, octoxy (polyethylene oxide-polypropylene oxide) mono(meth) acrylate, and nonylphenoxy(polyethylene oxide-propylene oxide) mono(meth)acrylate; hydroxycycloalkyl (meth)acrylates such as p-hydroxycyclohexyl (meth)acrylate; radical polymerizable monomers containing lactone modified hydroxyl group; amino alkyl (meth)acrylates such as 2-aminoethyl (meth)acrylate, 2-dimethylaminoethyl (meth)acrylate, 2-aminopropyl (meth)acrylate, and 2-butylaminoethyl (meth)acrylate; polymerizable monomers containing amide group such as (meth)acryl amide, N-methylol acrylamide, and N-butoxymethyl (meth)acryl amide; polyfunctional (meth)acrylates such as ethyleneglycol di(meth)acrylate, propylene glycol di(meth)acrylate, butylene glycol di(meth) acrylate, and trimethylolpropane tri(meth)acrylate; radical polymerizable monomers containing metal such as zinc diacrylate and zinc dimethacrylate; (meth)acrylates containing ultraviolet ray-resistant group such as 2-(2'-hydroxy-5'-(meth)acryloxyethyl phenyl)-2H-benzotriazole, 1-(meth) acryloyl-4-hydroxy-2,2,6,6-tetramethylpiperidine, 1-(meth) acryloyl-4-methoxy-2,2,6,6-tetramethylpiperidine, 1-(meth) acryloyl-4-amino-4-cyano-2,2,6,6-tetramethylpiperidine; other (meth) acrylic monomers such as dimethylaminoethyl (meth)acrylate methyl chloride salt, allyl (meth)acrylate, glycidyl (meth)acrylate, (meth)acrylonitrile, phenyl (meth)acrylate, benzyl (meth)acrylate, isobornyl (meth)acrylate, tetrahydrofurfuryl (meth)acrylate, methoxyethyl (meth) acrylate, and ethoxyethyl (meth)acrylate; carbonyl group-containing monomers based on aldehyde group or keto group such as acrolein, diacetone acryl amide, formyl styrene, vinyl methyl ketone, vinyl ethyl ketone, vinyl isobutyl ketone, pivalic aldehyde, diacetone (meth)acrylate, acetonitrile acrylate, and aceto acetoxyethyl (meth)acrylate; aromatic vinyl monomers such as styrene, methyl styrene, chlorostyrene, and methoxystyrene; conjugated diene monomers such as 1,3-butadiene, isoprene, and 2-chloro-1,3-butadiene; carboxyl group-containing monomers such as (meth)acrylic acid, itaconic acid, fumaric acid, maleic acid, and half ester thereof, 2-(meth)acryloxyethyl phthalic acid and 2-(meth)acryloxyethyl hexahydrophthalic acid; radical polymerizable monomers such as vinyl acetate, vinyl chloride, ethylene, and vinyl propionate; and silicone polymers having graft-linking agents discussed later, and further as occasion demands, radical polymerizable monomers containing oxirane group such as glycidyl (meth)acrylate; and radical polymerizable monomers containing self-crosslinkig functional groups such as alkylols or alkoxyalkyl compounds of ethylenic unsaturated amides such as N-methylol (meth)acryl amide, N-butoxymethyl (meth)acryl amide, and N-methoxymethyl (meth)acryl amide are given, however, they are not limited if they are radical polymerizable.

For polymer (I) used in the present invention, it is preferable to use a radical polymerizable monomer containing hydrolyzable silyl group to improve stain-resistance, weather resistance, and water resistance of the coating. By using the radical polymerizable monomer containing hydrolyzable silyl group, binding of the polymer and colloidal silica, and exposing contents of colloidal silica at the coating surface are improved, and stain-resistance, weather resistance, and water resistance are further improved. The content of radical polymerizable monomer containing hydrolyzable silyl group is preferably 0.1-20 parts by mass for 100 parts by mass of polymer (I). When the content of radical polymerizable monomer containing hydrolyzable silyl group is 0.1 part by mass or more, stain-resistance, weather resistance, and water resistance of the coating are improved, and when it is 20 parts by mass or less, stain-resistance, weather resistance, and water resistance are further improved without reducing freeze-thaw resistance of the coating. More preferably, it is 0.5-18 parts by weight.

The radical polymerizable monomer containing hydrolyzable silyl group is used to improve stain-resistance, weather resistance, and water resistance of the coating, however, it is also a component reducing freeze-thaw resistance. Thus, it is preferable to improve stain-resistance, weather resistance, and water resistance of the coating with small content For improving stain-resistance, weather resistance and water resistance of the coating with small content, this purpose is achieved by producing an emulsion particle having multilayer structures, and by copolymerizing the radical polymerizable monomer containing hydrolyzable silyl group for the outermost layer of the particle.

Further, it is preferable not to make hydrolyze a hydrolyzable part of the radical polymerizable monomer containing hydrolyzable silyl group in a polymerization process to restrain deterioration of freeze-thaw resistance, and it is preferable to polymerize at low temperature of 70° C. or less to achieve it.

For specific examples of the radical polymerizable monomer containing hydrolyzable silyl group, vinyl silanes such as vinyl methyldimethoxy silane, vinyl trimethoxy silane, vinyl triethoxy silane, vinyl methyldichloro silane, and vinyl trichloro silane; acryloyloxy alkyl silanes such as γ-acryloyloxy ethylmethyl dimethoxy silane, γ-acryloyloxy ethyltrimethoxy silane, γ-acryloyloxy ethyltriethoxy silane, γ-acryloyloxy propylmethyldimethoxy silane, γ-acryloyloxy propyltrimethoxy silane, γ-acryloyloxy propyltriethoxy silane, γ-acryloyloxy ethylmethyldichloro silane, γ-acryloyloxy ethyltrichloro silane, γ-acryloyloxy propylmethyldichloro silane, and γ-acryloyloxy propyltrichloro silane; methacryloyloxy alkyl silanes such as γ-methacryloyloxy ethylmethyldimethoxy silane, γ-methacryloyloxy ethyltrimethoxy silane, γ-methacryloyloxy ethyltriethoxy silane, γ-methacryloyloxy propylmethyldimethoxy silane, γ-methacryloyloxy propyltrimethoxy silane γ-methacryloyloxy propyltriethoxy silane, γ-methacryloyloxy ethylmethyldichloro silane, γ-methacryloyloxy ethyltrichloro silane, γ-methacry-loyloxy propylmethyldichloro silane, and γ-methacryloyloxy propyltrichloro silane are given. Above all, when vinyl polymerization reactivity, stain-resistance, weather resistance, and water resistance are considered, acryloyloxy alkyl silanes and methacryloyloxy alkyl silanes are preferable, and acryloyloxy alkyltrialkoxy silanes and methacryloyloxy alkyltrialkoxy silanes are more preferable.

In addition, more advanced stain-resistance, weather resistance, water resistance, and freeze-thaw resistance of the coating can be developed by obtaining polymer (I) having a specific structure using a siloxane polymer having a graft crosslinking point.

The specific structure of polymer (I) is a graft block copolymer comprising a polymer block (A) having a repetitive unit of dimethyl siloxane, a polymer block (B) having a repetitive unit of radical polymerizable monomers, and a silicon-containing graft-linking unit (C) which is copolymerized to polymer block (A) and polymer block (B).

Polymer block (A) composing the graft block copolymer can be synthesized from dimethyl dialkoxy silanes such as dimethyl dimethoxy silane and dimethyl diethoxy silane; dimethyl siloxane-cyclic oligomers such as hexamethyl cyclotri siloxane, octamethyl cyclotetra siloxane, decamethyl cyclopenta siloxane, dodecamethyl cyclohexa siloxane, tetradecamethyl cyclohepta siloxane, and dimethylcyclics (a mixture of a trimer to a heptanomer of dimethyl siloxane-cyclic oligomer), and dimethyldichloro silane as raw materials. Dimethyl siloxane-cyclic oligomer is the most preferable as raw materials of polymer block (A) when efficiency of heat stability and so on and the cost of the obtained resin are considered.

In addition, the mass average molecular mass of polymer block (A) is preferably 10,000 or more. When the mass average molecular mass is less than 10,000, durability of the obtained coating tends to deteriorate. More preferably, it is 50,000 or more.

Polymer block (B) has the repetitive unit of radical polymerizable monomers, and it is preferable that it is contained 50-99.7 parts by mass in 100 parts by mass of the graft block copolymer. When the content of polymer block (B) is 50 parts by mass or more, hardness, strength, and stain-resistance of the coating tend to improve. In addition, when it is 99.7 parts by mass or less, deterioration of weather resistance, water resistance, and freeze-thaw resistance of the coating tend to be restrained. More preferred content is 60-99.5 parts by mass.

The silicon-containing graftlinking unit (C) composing the graft block copolymer is a component to hold transparency of a painting coating to be obtained, and the above-described radical polymerizable monomers containing hydrolyzable silyl group can be used.

An emulsion of this type of graft block copolymer can be obtained by graft copolymerization of the polymerizable monomers composing polymer block (B) in the presence of a radical polymerization initiator after emulsion polymerization of the cyclic dimethylsiloxane oligomers and the graftlinking agent comprising radical polymerizable monomers containing hydrolyzable silyl group in the presence of an acidic emulsifier.

In addition, in the present invention, it is preferable that the radical polymerizable monomers containing hydrolyzable silyl group are not only used as graftlinking agents but also used for polymerization of block polymer (B).

In addition, from a point of storage stability of the aqueous coating material, blending stability when pigments and additives are blended at the production of the coating material, and stain-resistance of the coating, it is preferable that ethylenic unsaturated carboxylic acid monomers are used as copolymerizable components for the polymer used in the present invention. The content of the ethylenic unsaturated carboxylic acid monomers is preferably 0.1-10 parts by mass for 100 parts by mass of polymer (I). When the content is 0.1 part by mass or more, storage stability of the aqueous coating material improves, and when the aqueous coating material of the present invention was colored by adding a pigment, a problem of generation of agglomerates can be avoided and further stain-resistance of the coating is improved. In addition, when this content is 10 parts by mass or less, storage stability, blending stability of the aqueous coating material and stain-resistance of the coating can be further improved without reducing weather resistance and water resistance of the coating. More preferred content is 0.5-8 parts by mass.

For example, for the above ethylenic unsaturated carboxylic acid monomers, (meth)acrylic acid, itaconic acid, citraconic acid, maleic acid, monomethyl maleate, monobutyl maleate, monomethyl itaconate, monobutyl itaconate, vinyl benzoic acid, oxalic acid monohydroxyethyl (meth)acrylate, tetrahydrophthalic acid monohydroxyethyl (meth)acrylate, tetrahydrophthalic acid monohydroxypropyl (meth)acrylate, 5-methyl-1,2-cyclohexane dicarboxylic acid monohydroxyethyl (meth)acrylate, phthalic acid monohydroxyethyl (meth) acrylate, phthalic acid monohydroxypropyl (meth)acrylate, maleic acid monohydroxyethyl (meth)acrylate, maleic acid hydroxypropyl (meth)acrylate, and tetrahydrophthalic acid monohydroxybutyl (meth)acrylate are given. These can be used alone or in combination as occasion demands.

In addition, from a point of blending stability of the aqueous coating material and stain-resistance, weather resistance, water resistance, and adhesion for various materials of the coating, it is preferable that radical polymerizable monomers containing hydroxyl group and/or radical polymerizable monomers containing polyoxyalkylene group as copolymerization components for the polymer are used. This content is preferably 0.5-20 parts by mass for 100 parts by mass of polymer (I). When this content is 0.5 part by mass or more, blending stability of the aqueous coating material and stain-resistance, weather resistance, water resistance, and adhesion for various materials of the coating can be improved, and when it is 20 parts by mass or less, blending stability of the aqueous coating material, stain-resistance and adhesion for various materials of the coating can be further improved without reducing weather resistance and water resistance of the coating. More preferred content is 1-12 parts by mass.

For example, for the above radical polymerizable monomers containing hydroxyl group, hydroxymethyl (meth)acrylate, 2-hydroxyethyl (meth)acrylate, 2-hydroxypropyl (meth) acrylate, 3-hydroxypropyl (meth)acrylate, 4-hydroxybutyl (meth)acrylate, 6-hydroxyhexyl (meth)acrylate are given.

In addition, for these radical polymerizable monomers containing polyoxyalkylene group, for example, an hydroxy group end-type radical polymerizable monomers containing polyalkylene oxide group such as hydroxypolyethylene oxide mono(meth)acrylate, hydroxypolypropylene oxide mono (meth)acrylate, hydroxy (polyethylene oxide-polypropylene oxide) mono(meth)acrylate, hydroxy (polyethylene oxide-propylene oxide) mono(meth)acrylate, hydroxy (polyethylene oxide-polytetramethylene oxide) mono(meth)acrylate, hydroxy (polyethylene oxide-tetramethylene oxide) mono (meth)acrylate, hydroxy (polypropylene oxide-polytetramethylene oxide) mono(meth)acrylate, and hydroxy (polypropylene oxide-polytetramethylene oxide) mono(meth) acrylate; alkyl group end-type radical polymerizable monomers containing polyalkylene oxide group such as methoxy polyethylene oxide mono(meth)acrylate, lauroxy polyethylene oxide mono(meth)acrylate, stearoxy polyethylene oxide mono(meth)acrylate, allyloxy polyethylene oxide mono(meth)acrylate, nonylphenoxy polyethylene oxide mono(meth)acrylate, nonylphenoxy polypropylene oxide mono(meth)acrylate, octoxy (polyethylene oxide-polypropylene oxide) mono(meth)acrylate, nonylphenoxy (polyethylene oxide-propylene oxide) mono(meth)acrylate are given. These can be used alone or in combination as occasion demands.

In addition, from a point of weather resistance and water resistance of the coating, it is preferable that t-butyl methacrylate and/or cyclohexyl methacrylate are used as copolymerizable components for the polymer. This content is preferably 5-70 parts by mass for 100 parts by mass of polymer (I). When this content is 5 parts by mass or more, water resistance and weather resistance of the coating can be improved, and when it is 70 parts by mass or less, weather resistance and water resistance can be further improved without reducing freeze-thaw resistance of the coating. More preferred content is 10-60 parts by mass.

In addition, it is preferable that radical polymerizable monomers containing self-crosslinkable functional group are contained as copolymerizable components for a polymer from a point of stain-resistance, weather resistance, water resistance, and adhesion for various material of the coating. This content is preferably 0.1-15 parts by mass for 100 parts by mass of polymer (I). When this content is 0.1 part by mass or more, stain-resistance, weather resistance, water resistance, and adhesion for various materials of the coating can be improved, and when it is 15 parts by mass or less, stain-resistance and adhesion for various materials of the coating can be further improved without reducing water resistance and weather resistance of the coating. More preferred content is 0.5-12 parts by mass.

Here, radical polymerizable monomers containing self-crosslinkable functional group mean radical polymerizable monomers which are chemically stable at room temperature, in which the obtained resin disperses in a resin dispersion, and reactions between side-chain functional groups occur by drying at the time of the painting, heating, or another external factor to cause chemical bonds between the side chain groups. For example, for the radical polymerizable monomers containing self-crosslinkable functional group, radical polymerizable monomers containing oxirane group such as glycidyl (meth)acrylate and alkylols or alkoxyalkyl compounds of ethylenic unsaturated amides such as N-methylol (meth)acryl amide, N-butoxymethyl (meth)acryl amide, and N-methoxymethyl (meth)acryl amide are given. These can be used alone or in combination as occasion demands.

In addition, it is preferable that ultraviolet ray-resistant radical polymerizable monomers are contained as copolymerizable components used for the polymer, from a point of weather resistance of the coating. This content is preferably 0.1-10 part by mass for 100 parts by mass of polymer (I). When the content is 0.1 part by mass or more, weather resistance of the coating can be improved, and when it is 10 parts by mass or less, weather resistance of the coating can be further improved without reducing polymerization stability. More preferred content is 0.5-8 parts by mass.

For the ultraviolet ray-resistant radical polymerizable monomers, (meth)acrylates having photostabilizing action and (meth)acrylates having components having ultraviolet-absorption properties are typically given. For example, as (meth)acrylates having photostabilizing action, 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloylamino-1,2,2,6,6-pentamethylpiperidine, and 4-cyano-4-(meth)acryloyloxy-2,2,6-tetramethylpiperidine are given. For example, as (meth)acrylates having components having ultraviolet-absorption properties, 2-[2-hydroxy-5-(meth)acryloyloxy ethylphenyl]-2H-benzotriazole, 2-[2-hydroxy-3-t-butyl-5-(meth)acryloyloxy ethylphenyl]-2H-benzotriazole; and 2-[2-hydroxy-3-t-amyl-5-(meth)acryloyloxy ethylphenyl]-2H-benzotriazole are given. These can be used alone or in combination as occasion demands.

The preferred hydrolyzable radical polymerizable monomers containing silyl group, ethylenic unsaturated carboxylic acid monomers, radical polymerizable monomers containing hydroxyl group and/or radical polymerizable monomers containing polyoxyalkylene group, t-butyl methacrylate and/or cyclohexyl methacrylate, radical polymerizable monomers containing self-crosslinkable functional group, and ultraviolet ray-resistant radical polymerizable monomers can be used in combination as occasion demands.

For a production method of the coating component, a method to dilute with water after emulsion polymerization or solution polymerization, and a method to dilute with water after solution polymerization to remove solvent are given. It is preferable to use the aqueous coating composition obtained by the above production methods as a paint, and it is more preferable to use the aqueous coating composition obtained by emulsion polymerization.

Well-known methods such as a method, for example, of supplying a radical polymerizable monomer mixture into a polymerization system in the presence of a surfactant and polymerizing by a radical polymerization initiator can be used to obtain an emulsion by emulsion polymerization.

As an initiator, a compound generally used for radical polymerization can be used. For specific examples, persulphuric acid salts such as potassium persulfate, sodium persulfate, and ammonium persulfate; oil soluble azo compounds such as azobisisobutyronitrile, 2,2'-azobis(2-methyl butyronitrile), 2,2'-azobis(2,4-dimethyl valeronitrile), 2,2'-azobis(4-methoxy-2,4-dimethyl valeronitrile), and 2-phenylazo-4-methoxy-2,4-dimethyl valeronitrile; water soluble azo compounds such as 2,2'-azobis{2-methyl-N-[1,1-bis(hydroxymethyl)-2-hydroxyethyl]propionamide}, 2,2'-azobis{2-methyl-N-[2-(1-hydroxyethyl)]propionamide}, 2,2'-azobis{2-methyl-N-[2-(1-hydroxybutyl)]propionamide}, 2,2'-azobis[2-(5-methyl-2-imidazoline-2-yl) propane] and salts thereof, 2,2'-azobis[2-(2-imidazoline-2-yl) propane] and salts thereof, 2,2'-azobis[2-(3,4,5,6-tetrahydropyrimidine-2-yl) propane] and salts thereof, 2,2'-azobis(1-imino-1-pyrrolidino-2-methylpropane) and salts thereof, 2,2'-azobis{2-[1-(2-hydroxyethyl)-2-imidazoline-2-yl]propane} and salts thereof, 2,2'-azobis(2-methyl propioneamidine) and salts thereof, 2,2'-azobis[N-2-carboxyethyl)-2-methyl propioneamidine] and salts thereof; and organic peroxides such as benzoyl peroxide, cumene hydroperoxide, t-butyl hydroperoxide, t-butyl peroxy-2-ethyl hexanoate, and t-butyl peroxy isobutyrate are given. These initiators can be used alone or in combination. In addition, when promotion of a rate of polymerization and polymerization at low-temperature polymerization of 70° C. or less are expected, for example, it is profitable that water soluble azo compounds such as 2,2'-azobis[2-(2-imidazoline-2-yl) propane] and salts thereof having 70° C. or less of 10 hour-half life temperature or reducing agents such as sodium bisulphite, ferrous sulfate, ascorbate, and Rongalite are used together with radical polymerization catalysts.

Since it is preferable to use the above initiators because low-temperature polymerization in 70° C. or less is preferable not to make hydrolyze a hydrolyzable part of the hydrolyzable radical polymerizable monomers containing silyl group in a polymerization process. Above all, it is more preferable to use the water-soluble azo compounds such as 2,2'-azobis[2-(2-imidazoline-2-yl) propane] and salts thereof from a point of stain-resistance, weather resistance, and water resistance of the coating.

The content of a radical polymerization initiator is usually 0.01-10% by mass for total contents of the radical polymerizable monomers, and when progress of the polymerization and control of the reaction are taken into account, 0.05-5% by mass is preferred.

When molecular mass of polymer (I) is adjusted, as molecular mass modifiers, well-known chain transfer agents that are mercaptans such as n-dodecyl mercaptan, t-dodecyl mercaptan, n-octyl mercaptan, n-tetradecyl mercaptan and n-hexyl mercaptan; halogen compounds such as carbon tetrachloride and ethylene bromide; α-methyl styrene dimer and so on can be used. Usually, it is 1% by mass or less for the total contents of the radical polymerizable monomers.

In addition, as for the aqueous coating material, it is preferable that 0.1-10 parts by mass of a surfactant is contained for 100 parts by mass of polymer (I). When there has 0.1 part by mass or more of the surfactant, storage stability of the aqueous coating material can be improved, and when emulsion polymerization is proceeded in the presence of the surfactant, stability in polymerization can be improved. In addition, stability at the time of mixing the paints, stability with time, and so on can be maintained without reducing water resistance by controlling the content of the surfactant to be 10 parts by mass or less. More preferred content is 0.5-8 parts by mass.

For the surfactant, various conventionally known anionic, cationic, or nonionic surfactants and polymer emulsifiers are given. In addition, so-called reactive emulsifiers having ethylenic unsaturated bonds in a surfactant component can be used.

Stability of the emulsion obtained by emulsion polymerization can be improved by adjusting pH between a neutral condition and weak alkaline condition, namely, pH 6.5-10.0 level by addition of a basic compound after polymerization. For example, as the above basic compound, ammonia, triethylamine, propylamine, dibutylamine, amylamine, 1-aminooctane, 2-dimethyl aminoethanol, ethyl aminoethanol, 2-diethyl aminoethanol, 1-amino-2-propanol, 2-amino-1-propanol, 2-amino-2-methyl-1-propanol, 3-amino-1-propanol, 1 dimethyl amino-2-propanol, 3-dimethyl amino-1-propanol, 2-propyl aminoethanol, ethoxypropylamine, aminobenzyl alcohol, morpholine, sodium hydroxide, and potassium hydroxide are given.

The aqueous coating material described in claim 2 is explained. In the following, this aqueous coating material is abbreviated with the first aqueous coating material.

The first aqueous coating material contains polymer (I) comprising 0.1-20 parts by mass of a radical polymerizable monomer containing hydrolyzable silyl group (a) and 80-99.9 parts by mass of another copolymerizable component (b) (100 parts by mass of (a) and (b) in total), colloidal silica (II) having an average particle size of 60 nm or less, and an anionic surfactant shown in the following (III) and a nonionic surfactant, and contains 0.5-20 parts by mass of colloidal silica (II) in solid content for 100 parts by mass of polymer (I). The coating described in claim 1 can be obtained by applying the aqueous coating material.

(III): Sulfate salt of polyoxyalkylene aryl ether, sulfate salt of polyoxyalkylene alkylaryl ether, formalin condensate of sulfate salt of polyoxyalkylene aryl ether, and formalin condensate of sulfate salt of polyoxyalkylene alkylaryl ether As for the aqueous coating material of the present invention, stain-resistance, weather resistance, and water resistance of the coating can be improved by containing radical polymerizable monomers containing hydrolyzable silyl group. This content is 0.1-20 parts by mass for 100 parts by mass of polymer (I). When the content is 0.1 part by mass or more, stain-resistance, weather resistance, and water resistance of the coating can be improved, and when it is 20 parts by mass or less, stain-resistance, weather resistance, and water resistance can be further improved without reducing freeze-thaw resistance of the coating. The content is preferably 0.5-18 parts by mass, and more preferably 1-15 parts by mass.

In addition, as for this aqueous coating material, it is necessary to contain the anionic surfactant shown in (III) and the nonionic surfactant from a point of stain-resistant of the coating. It makes much increase the area that the exposed colloidal silica occupies at the coating surface, and the coating having remarkable hydrophilic property and anti-static property is provided effectively by using these specific surfactants.

It is preferable that the anionic surfactant shown in (III) contains 0.1-10 parts by mass for 100 parts by mass of polymer (I). When there has 0.1 part by mass or more of the surfactant, stain-resistance of the coating, stability at the time of producing the coating material, and storage stability of the aqueous coating material can be improved, and when emulsion polymerization is proceeded in the presence of the surfactant, stability in polymerization can be improved. In addition, when there has 10 parts by mass or less of the surfactant, stain-resistance of the coating, stability at the time of producing the coating material and storage stability of the aqueous coating material can be improved without reducing water resistance, and when emulsion polymerization is proceeded in the presence of the surfactant, stability in polymerization can be improved. More preferred content is 0.5-8 parts by mass.

In addition, to make much increase the area that the exposed colloidal silica occupies at the coating surface and to provide effectively the coating having remarkable hydrophilic property and anti-static property, polyoxyethylene is preferable as polyoxyalkylene parts of the anionic surfactant shown in (III), and number of the repetitive unit is preferably 30 or less, and more preferably 20 or less.

For aryl part of the anionic surfactant shown in (III), for example, phenyl, naphthyl, biphenyl, cumylphenyl, (monopenta) benzylphenyl, (mono-penta) styryl phenyl, (monopenta) styryl cyclohexylphenyl, (mono-penta) benzyl biphenyl and styryl cumylphenyl are given.

In addition, as sulfate salts of the anionic surfactants shown in (III), for example, a sulfuric ester sodium salt, a sulfuric ester potassium salt, a sulfuric ester calcium salt and a sulfuric ester ammonium salt are given.

Among the anionic surfactants shown in (III), for example, it is available as the "CP series" (Trade name, manufactured by Toho Chemical Industry Co., Ltd.) for sulfate salt of polyoxyalkylene aryl ether. In addition, it is available as "NEW-COL 707SF" (Trade name, manufactured by Nippon Nyukazai Co., Ltd.) for sulfate salt of polyoxyalkylene alkylaryl ether. In addition, it is available as "SP-185FNa" (Trade name, manufactured by Toho Chemical Industry Co., Ltd.) for formalin condensate of sulfate salt of polyoxyalkylene aryl ether. In addition, it is available as "ANTOX MS-60" (Trade name, manufactured by Nippon Nyukazai Co., Ltd.) for formalin condensate of sulfate salt of polyoxyalkylene alkylaryl ether.

Among the anionic surfactants shown in (III), the most preferred ones are two kinds of anionic surfactants shown in general formula (1) and general formula (2) in the following. These emulsifiers are available as "CP-12Na" (Trade name, manufactured by Toho Chemical Industry Co., Ltd., n=12), "SP-185FNa" (Trade name, manufactured by Toho Chemical Industry Co., Ltd., n=13).

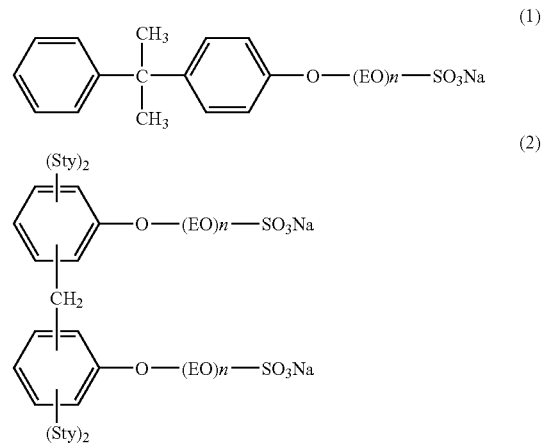

The content of the nonionic surfactant used in this aqueous coating composition is preferably 0.1-10 parts by mass for 100 parts by mass of polymer (I). When there has 0.1 part by mass or more of the surfactant, stain-resistance of the coating, stability at the time of producing of the coating material and storage stability of the aqueous coating material can be improved, and when emulsion polymerization is proceeded in the presence of the surfactant, stability in polymerization can be improved. In addition, when there has 10 parts by mass or less of the surfactant, stain-resistance of the coating, stability at the time of producing of the coating material and storage stability of the aqueous coating material can be improved without reducing water resistance, and when emulsion polymerization is proceeded in the presence of the surfactant, stability in polymerization can be improved. Preferred content is 0.5-9 parts by mass. More preferred content is 1-8 parts by mass.

For the nonionic surfactant, for example, polyoxyalkylene alkyl ether, polyoxyalkylene alkylphenol ether, polyoxyalkylene aryl ether, polyoxy alkylene alkylaryl ether, sorbitan derivatives, formalin condensate of polyoxyalkylene aryl ether, formalin condensate of polyoxyalkylene alkylaryl ether are given, and polyoxyalkylene alkyl ether is particularly preferable to make much increase the area that the exposed colloidal silica occupies at the coating surface and to provide effectively the coating having remarkable hydrophilic property and anti-static property.

As alkyl parts of polyoxyalkylene alkyl ethers, for example, alkyl group of a linear chain type or a divergent chain type of carbon number of 1-36 are given. In addition, to make much increase the area that the exposed colloidal silica occupies at the coating surface and to provide effectively the coating having remarkable hydrophilic property and anti-static property, polyoxyethylene is preferable for a polyoxyalkylene part of polyoxyalkylene alkyl ethers. In addition, the number of the repetitive unit of polyoxyethylene is preferably 10 or more, and is more preferably 20 or more. A previously described effect rises when the number of the repetitive unit of polyoxyethylene is large.

Among polyoxyalkylene alkyl ethers, the most preferred surfactants are ones shown in the following general formula (3). One of these emulsifiers are available as "EMULGEN 1150S-70" (Trade name, manufactured by Kao Corporation, R: major carbon number of 11, n=50).

(Herein, n=0 or positive number, R is alkyl group of 1-36 linear chain type or divergent type.)

In this aqueous coating material, to improve stability at the time of producing the coating material, storage stability of the aqueous coating material, polymerization stability when emulsion polymerization in the presence of a surfactant, a surfactant except well-known various anionic emulsifiers, cationic emulsifiers, polymer emulsifiers, anionic surfactants shown in (III) such as reactive emulsifiers having ethylenic unsaturated bonding in surfactant components and nonionic surfactants can be used in combination. However, it is preferable that only the anionic surfactant shown in (III) and nonionic surfactants are used, to make much increase the area that the exposed colloidal silica occupies at the coating surface and to provide effectively the coating having remarkable hydrophilic property and anti-static property.

Further, it is preferable that only the anionic surfactant shown in (III) and polyoxyalkylene alkyl ether (the nonionic surfactants) are used.

With regard to methods of addition of the anionic surfactant shown in (III) and the nonionic surfactant, addition in a manufacturing process of polymer (I) and addition after production of polymer (I) are given, however, it is not limited.

The aqueous coating material shown in claim 3 is explained. In the following, this aqueous coating material is abbreviated as the second aqueous coating material.

The second aqueous coating material contains polymer (I) comprising 4-20 parts by mass of the unit of a radical polymerizable monomer containing hydrolyzable silyl group (a) and 80-96 parts by mass of another copolymerizable monomer unit (b) (100 parts by mass of (a) and (b) in total) and colloidal silica (II) having an average particle size of 60 nm or less, and is the aqueous coating material containing 0.5-20 parts by mass of colloidal silica (II) in solid content for 100 parts by mass of polymer (I), then, the coating which describes to claim 1 by applying this aqueous coating material can be obtained.

In this aqueous coating material, it is necessary to contain radical polymerizable monomers containing hydrolyzable silyl group from a point of stain-resistance, weather resistance and water resistance of the coating. The content is 4-20 parts by mass for 100 parts by mass of polymer (I). When the content is 4 parts by mass or more, stain-resistance, weather resistance and water resistance of the coating can be improved, and when it is 20 parts by mass or less, stain-resistance, weather resistance and water resistance can be further improved without reducing freeze-thaw resistance of the coating. The content is preferably 4.5-18 parts by mass, and is more preferably 5-15 parts by mass.

In this aqueous coating material, an emulsifier to be used is not limited in particular.

In addition, with regard to radical polymerizable monomers containing hydrolyzable silyl group and other monomers, previously described monomers can be used.

The aqueous coating material shown in claim 4 is explained. In the following, this aqueous coating material is abbreviated with the third aqueous coating material.

The third aqueous coating material comprises 0.5-20 parts by mass of colloidal silica (II) having an average particle size of 60 nm or less in solid content for 100 parts by mass of polymer (I) and 0.5-20 parts by mass of an organic solvent with octanol/water distribution coefficient of less than 0.8, and the coating described in claim 1 by applying this aqueous coating material can be obtained.

In this aqueous coating material, a kind of an emulsifier to be used and the content of units of radical polymerizable monomers containing hydrolyzable silyl group are not limited in particular.

[Organic Solvents]

The organic solvent is a component improving dispersibility of colloidal silica, and the ones with octanol/water distribution coefficient of less than 0.8 can be used. By using the organic solvent with octanol/water distribution coefficient of less than 0.8, the content of exposure of colloidal silica to the surface is increased for the coating formed by the aqueous coating material, and stain-resistance in film formation can be improved. Further, dispersibility of colloidal silica in the coating becomes high so that weather resistance and freeze-thaw resistance can be improved.

Octanol/water distribution coefficient of an organic solvent is the value measured by following a method established with "distribution coefficient (1-octanol/water) measurement-flask vibration" in Japanese Industrial Standard Z7260-107 (2000).

As the organic solvent of octanol/water distribution coefficient of less than 0.8, for example, alcohols such as methanol, ethanol, n-propanol, isopropanol, i-butanol, t-butanol, 2-butanol, allyl alcohol, ethylene glycol, 1,2-propanediol, diethylene glycol, triethylene glycol, tetraethylene glycol and dipropylene glycol; ethers such as dimethyl ether, methyl cellosolve, ethyl cellosolve, methyl carbitol, carbitol, butyl carbitol, diethyl carbitol, tetrahydrofuran, propylene glycol monomethyl ether and dipropylene glycol methyl ether; ketones such as acetone, methyl ethyl ketone, 2,4-penta dione and ε-caprolactone; esters such as methyl acetate, ethyl acetate, propylene glycol monomethyl ether acetate, methyl cellosolve acetate, cellosolve acetate and carbitol acetate and acetonitrile are given, and these can be appropriately used alone in combination. In addition, these organic solvents can be applied with commercial ones because of no limitation for purification.

In addition, octanol/water distribution coefficient of representative solvents are as follows: 0.25 of methanol; −0.31 of ethanol; 0.05 of isopropanol; 0.25 of 1-propanol; −0.77 of methyl cellosolve; −0.32 of ethyl cellosolve; −0.54 of carbitol; −1.36 of ethylene glycol; −0.24 of acetone; 0.29 of methyl ethyl ketone and −0.34 of acetonitrile.

The content of the organic solvent occupied in the aqueous coating material is 0.5-20 parts by mass for 100 parts by mass of the polymer, and it is preferably 1-18 parts by mass. When the content of the organic solvent is 0.5 parts by mass or more, dispersibility and the content of exposure to the coating surface of colloidal silica in film formation can be improved, and stain-resistance, water contact angle, anti-static property and water wettability can be improved. In addition, when it is 20 parts by mass or less, the content of exposure of colloidal silica to the coating surface is increased without reducing storage stability and film formability, and stain-resistance, water contact angle, anti-static property and water wettability in film formation can be improved.

Subsequently, this aqueous coating material can be provided by adding 0.5-20 parts by mass of the organic solvent with octanol/water distribution coefficient of less than 0.8 to a mixture of 100 parts by mass of polymer (I) and 0.5-20 parts by mass (as a solid) of colloidal silica (II) having an average particle size of 60 nm or less. The organic solvent can be added between the time just after mixing the polymer and colloidal silica and the time just before painting. More preferably, it is effective when it is added just before the painting. When mixing each component, a vessel with an agitator can be used. According to this process for producing, by adding the organic solvent of octanol/water distribution coefficient of less than 0.8, the content of exposure of colloidal silica to the coating surface can be more increased, further, dispersibility of colloidal silica in the coating can be improved. As a result, extremely excellent stain-resistance can be achieved, and higher transparency, weather resistance and freeze-thaw resistance can be developed.

This aqueous coating material can be provided by adding the mixture, that 0.5-20 parts by mass (as a solid) of colloidal silica having an average particle size of 60 nm or less and 0.5-20 parts by mass of the organic solvent with octanol/water distribution coefficient of less than 0.8 were mixed in advance, to 100 parts by mass of the polymer. The mixture can be added at any time if it is added just before the painting. More preferably, it may be added just before the painting. When mixing each component, a vessel with an agitator can be used. According to this process for producing, by adding the mixture, that the organic solvent with octanol/water distribution coefficient of less than 0.8 and colloidal silica having an average particle size of 60 nm or less were mixed in advance, to the polymer, the content of exposure of colloidal silica to the coating surface is more increased, further, dispersibility of colloidal silica in the coating can be improved. As a result, extremely excellent stain-resistance can be achieved, and higher transparency, weather resistance and freeze-thaw resistance can be developed. In addition, this aqueous coating material can be provided by adding 0.5-20 parts by mass (as a solid) of colloidal silica having an average particle size of 60 nm or less to the mixture of 100 parts by mass of the polymer and 0.5-20 parts by mass of the organic solvent with octanol/water distribution coefficient of less than 0.8 as well as the previously described methods.

The first to the third aqueous coating materials are usually used in 10-80 mass % in solid content. In addition, to produce high efficiency as a coating material, various additives such as various pigments, defoaming agents, pigment dispersants, leveling agents, sag control agents, delustering agents, UV absorbers, antioxidants, heat resistant improvers, slipping agents, preservatives, plasticizers, film formation assistants may be contained, further, other polymer emulsions, water soluble resins, viscosity control agents and, hardeners such as melamine may be blended.

As film formation assistants, normal materials used with water-based paints can be used. For example, aliphatic alcohols of linear type, divergent type or cyclic type of carbon number 5-10; alcohols containing aromatic group; monoethers of (poly)ethylene glycol or (poly)propylene glycol and so on shown in general formula $HO-(CH_2CHXO)_n-R^1$ ($R^1$; linear or branch-type alkyl group of carbon number 1-10: X; hydrogen or methyl group: n; integer of 5 or less); (poly)ethylene glycol ether esters or (poly)propylene glycol ether esters shown in general formula $R^2COO-(CH_2CHXO)_n-R^3$ ($R^2$, $R^3$; linear or branch-type alkyl group of carbon number 1-10: X; hydrogen or methyl group: n; integer of 5 or less);
aromatic organic solvents such as toluene and xylene; mono or diisobutyrate of 2,2,4-trimethyl-1,3-pentanediol, 3-methoxybutanol, 3-methoxybutanol acetate, 3-methyl-3-methoxybutanol and 3-methyl-3-methoxybutanol acetate are given.

To form the coating on the surface of various raw materials using the first to the third aqueous coating material, for example, various painting methods such as a mist coating method, a roller coating method, a bar coating method, an air-knife coating method, a brush painting and dipping method can be selected appropriately, the coating which formed a film sufficiently can be obtained with room temperature drying or heat drying at 40-200° C. In addition, the coating more excellent in weather-resistance can be achieved with strong binding between emulsion particles by heating at the temperature or more of glass transition temperature of the polymer after forming the coating by drying at low temperature of room temperature or around 50° C. At the above case, some sinking of colloidal silica being exposed to the coating surface is observed so that heating in a short time is effective.

The coating of the present invention has no limitation in particular for a film formation area, and it can be performed with a coated article on various kinds of articles (referred to as substrate conveniently). As such a substrate, for example, a cement mortar, a slate board, a gypsum board, an extrusion sheet, a foamed concrete, a metal, a glass, a porcelain tile, an asphalt, a wood, a waterproofing gumwood, a plastic, and a calcium silicate substrate are given. In addition, the coating of the present invention can be evaluated as top finishes of these various substrates.

In addition, as coated articles having the coating of the present invention, for example, building materials, building exterior parts, building interior parts, window frames, window glasses, structural elements, boards, exterior parts of vehicles, exterior parts of mechanical devices and products, dust covers, reflector plates for road traffic signs, visual guidance indicators, road markings, various display devices, advertising towers, noise barrier walls for roads, noise barrier walls for railroads, decorative sheets for roads, light source covers for signals, outdoor display boards, bridges, guardrails, tunnel interior parts, lighting installations in tunnels, glasses, solar battery covers, heat collection covers of solar water heaters, plastic greenhouses, lighting covers for vehicles, mirrors for roads, mirrors for vehicles, measurement covers and measurement boards for two-wheeled vehicles, glass lens, plastic lens, helmet shields, goggles, window glasses for houses, cars and railway vehicles, vehicle windshields, show-cases, thermal insulation show-cases, film structure materials, fins for heat exchange, glass surfaces of various kinds of places, blinds, tire wheels, roof covers, roof flumes, antennas, power transmission lines, housing equipments, toilet stools, bathtubs, washstands, lighting equipments, lighting covers, kitchen wares, table wares, table-ware storing devices, dish washers, table-ware dryers, sinks, cooking ovens, kitchen hoods, ventilation fans, aquarium materials for appreciation, facing materials of portions touching circulated water in application facilities circulated water, anti-thrombogenic materials, antiprotein adhesion materials, lipid adhesion proofing materials, contact lens, catheters for withdrawing of urine, percutaneous devices, artificial organs, blood bags, blood bags for collection, lung drainages, ship's bottoms, tent-material canvases, tools for glide, functional fibers, displays for display screens such as televisions or PC and a film sticking on the products are given.

In other words, the present invention can be used for various coating applications like aqueous coating compositions used for building frame protection such as architectural structures and civil engineering structures, and it is extremely useful for industry.

EXAMPLE

In the following, the present invention is explained by embodiment in detail, however, the present invention is not limited by these at all. In addition, "part" is a mass standard in description of the following. About examinations of physical properties of the aqueous coating material, examinations were performed based on the following methods.

<Ratio of the Area That Exposed Colloidal Silica Occupies at the Coating Surface>

It was measured with image processing of a secondary electron image of a scanning electron micrograph of the coating surface. An electron microgram scanning condition and a software used for image processing are shown in the following.

Electron Microgram

A JSM-6340F type field emission form scanning electron microscope manufactured by JEOL Ltd.

Acceleration voltage 2.5 kV, magnification 50,000 times/image processing analysis Planetron Inc., Image-Pro Plus Analyzing target minimal area; 1e-5 µm2

<Manufacture of Panels for Evaluation of Water Contact Angle, Carbon Staining-Resistant, Weather Resistance and Water Resistance>

An aqueous coating composition provided in a production example was coated on a steel sheet treated with zinc phosphate (a steel sheet treed with "Bondelite #100", thickness of 0.8 mm, length of 150 mm, width of 70 mm) with a bar coater #60 under an atmosphere of 40° C. and was dried at 130° C. for 5 minutes. Afterwards, the material dried at room temperature for 1 day was used for a blackboard for evaluation of water contact angle, carbon stain-resistance, weather resistance and water resistance.

<Manufacture of a Panel for Evaluation of Anti-Static Property>

An aqueous coating composition provided in a production example was coated on a "MMA sheet" (manufactured by Mitsubishi Rayon Co., Ltd.) with a bar coater #60 under an atmosphere of 40° C. and was dried at 130° C. for 5 minutes. Afterwards, a blackboard of anti-static property for evaluation was measured with a sample cut for 4 cm squares after drying the material under an atmosphere for 1 day.

<Manufacture of Panel for Evaluation of Outdoor Exposure Stain-Resistance>

A white enamel coating (PVC=40%) using "DIANAL LX-2011" (Trade name, Mitsubishi Rayon Co., Ltd.) as an intermediate coating was spray-coated on a steel sheet treated with zinc phosphate (a steel sheet treated with "BONDELITE #100", thickness of 0.8 mm, length of 300 mm, width of 100 mm) to result in dry film thickness of 50 µm at room temperature and was dried at 130° C. for 5 minutes. Subsequently, an aqueous coating composition provided in the production example was spray-coated to result in dry film thickness of 30 µm at room temperature and was dried at room temperature for 1 day after drying at 130° C. for 5 minutes. This was used as a blackboard of outdoor exposure stain-resistance for evaluation.

<Manufacture of the Coating for Coating-Elongation Evaluation>

An aqueous coating composition provided in a production example was coated on a PET film with an applicator of 10 MIL at room temperature and was dried at room temperature for 1 day after drying at 80° C. for 12 hours. This painting film was cut in dumb-bell shape with model 2, and the coating was peeled off from a PET film. This was used as the coating for coating-elongation evaluation.

<Testing Method>

(1) Transparency

A clear coating material for evaluation was coated on a glass plate with a 4 MIL applicator under an atmosphere of 40° C., and a blackboard for evaluation was obtained after drying at 130° C. for 5 minutes. Transparency of the coating was observed in visual observation, and it was determined in a standard of the following.

"○": Transparent

"Δ": Translucent

"X": Cloudiness (2) Water Contact Angle

Using a CA-X150 type FACE contact angle meter manufactured by Kyowa Interface Science Co., Ltd., a drop of water of 0.4µ (scale graduated in a screen; scale 3) was titrated on to a blackboard for evaluation, and water contact angle after 30 seconds was measured.

(3) Anti-Static Property

A test panel for evaluation was attached to STATIC HONEST METER S-5109 manufactured by Shishido Electrostatic, Ltd., the half-life period shown in JIS L 1094 was measured, and anti-static property was determined with the following standards. At the above case, application was stopped after continuing application of plus 10 kV for 30 seconds, and measurement was performed for 180 seconds after application start with maintaining turning of a turning table.

"⊚": 30 seconds or less

"○": 30 seconds or more, less than 90 seconds

"Δ": 90 seconds or more, less than 180 seconds

"X": 180 seconds or more (4) Elimination Property of Carbon Pollution

Immediately after water was sprayed on a blackboard for evaluation by a sprayer, 10% petroleum benzene solution of carbon MA100 (manufactured by Mitsubishi Chemical Corp.) by using a dropping pipet was dripped, and it was washed away with city water 5 seconds later. About the portion where the carbon solution had been dripped, adhesion level of carbon to the coating was observed in visually, and elimination property of carbon pollution was determined with the following standards.

"⊚": No adhesion at all

"○": A little adhesion at portional area

"Δ": Thin adhesion at whole area

"X": Thick adhesion at whole area (5) Outdoor Exposure Stain-Resistance

A test panel of 300×100 mm was bent so that the internal angle became 135 degrees at a one-third length from the upper part. The test panel was set up so that it was faced to a south aspect in Toyohashi plants, Mitsubishi Rayon Co., Ltd. (Ushikawadori, Toyohashi-shi), so that a wide side area (a perpendicular side) was performed perpendicularly, and further so that a small side area (an upper side) was in the upper part. After exposure of 6 months, difference of whiteness ΔL before and after exposure in the upper surface of a painting film was measured by a colorimeter, and existence of rain-line pollution of the perpendicular side was evaluated in visual observation. An acceptance standard is shown in the following.

(Difference of Whiteness ΔL Before and After Exposure at the Upper Surface of a Painting Film)

"⊚": Less than 2.5

"○": 2.5 or more, less than 5.0

"Δ": 5.0 or more, less than 7.5
"X": 7.5 or more
(Existence of Rain-Line Pollution of the Perpendicular Side)
"⊚": No rain-line pollution.
"○": A little rain-line pollution is seen.
"X": Rain-Line pollution is obviously seen (6) Weather Resistance A test panel was cut to a size of 70 mm×50 mm, and this test panel was entered in "Daipla metal weather KU-R4-W type" (manufactured by Daipla Wintes Co., Ltd.). Weather resistance was determined in the following standards with a weather-resistant guideline of a testing cycle for 4 hour's irradiation (atomization 5 seconds/15 minutes)/4 hour's dew formation, UV strength of 85 mW/cm$^2$, black-panel temperature of 63° C. at irradiation time/30° C. at dew formation time, humidity of 50% RH at irradiation time/96% RH at dew formation time and retention of 60° gross of every 96 hours (12 cycles) progress. In addition, it was continued for 480 hours (60 cycles) as the longest time.

"⊚": 90% or more
"○": 70% or more, less than 90%
"Δ": 50% or more, less than 70%
"X": Less than 50%, or a peeling/crack of the coating occurs.

(7) Water Resistance

A test panel was determined in the following standards with a water-resistant guideline of gloss retention of 60° gross of the coating that was dried at room temperature after dipping in pure water for 5 days at 60° C.

"⊚": 90% or more
"○": 70% or more, less than 90%
"Δ": 50% or more, less than 70%
"X": Less than 50%

(8) Coating-Elongation

The elongation measurement of the coating for coating elongation evaluation was measured by using a Tensilon measuring machine. In addition, this rate of testing was performed at 50 mm/min, load cell rating was 1 kN and the environmental temperature at the time of the measurement was at 25° C.

Production Example 1

Preparation of an Aqueous Dispersion of a Polyorgano Siloxane Polymer

A composition comprising 95 parts by mass of cyclic dimethyl siloxane oligomer mixtures of trimer to heptanomer, 5 parts by mass of γ-methacryloyloxy propyl trimethoxy silane, 250 parts by mass of deionized water, 0.4 part by mass of sodium dodecylbenzene sulfonate and 0.4 part by mass of dodecylbenzene sulfonic acid is premixed in a homomixer. Then, pre-emulsion of the raw material was obtained with emulsifying compulsively with pressure of 200 kg/cm$^2$ using a pressure-type homogenizer.

Subsequently, to a flask comprising an agitator, a reflux cooling pipe, a thermal control unit and titration pump, 55 parts by mass of water and 5 parts by mass of dodecylbenzene sulfonic acid were added. While keeping the inner temperature of the flask at 85° C. under agitation, the above pre-emulsion of the raw materials was titrated with 4 hours. An aquaous dispersion of polyorgano siloxane copolymer (SiEm) was prepared by adding of ammonia with equal molar content of dodecylbenzene sulfonic acid, after a titration, further 1 hour polymerization and cooling off. The solid content was 22.7%.

Example 1

To a flask comprising an agitator, a reflux cooling pipe, a thermal control unit and a titration pump, 80 parts by mass of deionized water, 2.5 parts by mass of "CP-12Na" (manufactured by Toho Chemical Industry Co., Ltd., a non-reactive type anionic surfactant, solid content 30%) and a mixture of the radical polymerizable monomer which was a component of a copolymer shown in "the first step" (an inner layer) of the following table 1 was added. After having raised an inner temperature of the flask to 50° C., an aqueous initiator solution of ammonium persulfate 0.15 parts by mass/deionized water 1 part by mass was added, then, an aqueous reducing agent solution of sodium hydrogensulfite 0.05 part by mass/deionized water 1 part by mass was further added. After 1 hour of addition of the aqueous reducing agent solution, confirmation at peak top temperature by exothermic of the polymerization and helding the inner temperature of a flask to 65° C., an aqueous surfactant solution of "EMULGEN 1150S-70" (manufactured by Kao Corporation, a non-reactive type nonionic surfactant, solid content 70%) 1.43 parts by mass/deionized water 1.9 parts by mass was added.

After 0.5 hour of the aqueous surfactant solution addition, pre-emulsion that a mixture of radical polymerizable monomers which is a component of the copolymer shown in "the second step" (an outer layer) in the following table 1, 21 parts by mass of deionized water, 6.7 parts by mass of CP-12Na and 0.115 part by mass of AMP-90 (90% aqueous solution of 2-amino-2-methyl-1-propanol) were emulsified dispersed in advance and the initiator solution of VA-061 (manufactured by Wako Pure Chemical Industries, Ltd.) 0.1 part by mass/methanol 2 parts by mass/deionized water 3 parts by mass were titrated by 2 lines with 1.5 hours. When titrating, the inner temperature of the flask was maintained at 65° C., and after titration was finished, it was maintained at 65° C. for 1 hour. Further, it was maintained at 65° C. for 0.5 hour after addition of 0.63 part by mass of 28% aqueous ammonia.

Afterwards, it was cooled off to room temperature, and an aqueous coating material was obtained with adding 25 parts by mass (5 parts by mass in solid content) of "SNOWTEX O" (manufactured by Nissan Chemical Industries, Ltd, an aqueous colloidal silica dispersion, SiO$_2$ solid content=20%).

Further, the coating material was obtained with adding 5 parts by mass of butyl cellosolve as a film formation auxiliary.

A coating was prepared using the provided coating material, and transparency, water contact angle, anti-static property, carbon stain-resistance, outdoor exposure stain-resistance, weather resistance and water resistance were tested. The results are shown in the following table 4.

Example 2

To a flask comprising an agitator, a reflux cooling pipe, a thermal control unit and a titration pump, 80 parts by mass of deionized water, 2.5 parts by mass of CP-12Na, 4 parts by mass (0.9 part by mass in solid content) of SiEm and a mixture of the radical polymerizable monomer which was a component of a copolymer shown in the first step (an inner layer) of the following table 1 was added. After having raised an inner temperature of the flask to 50° C., an aqueous initiator solution of ammonium persulfate 0.15 part by mass/deionized water 1 part by mass was added, then, an aqueous reducing agent solution of sodium hydrogensulfite 0.05 part by mass/deionized water 1 part by mass was further added. After 1 hour of addition of the aqueous reducing agent solution, confirmation at peak top temperature by exothermic of the polymerization and helding the inner temperature of a flask to 65° C., an aqueous surfactant solution of "EMULGEN 1150S-70" 1.43 parts by mass/deionized water 1.9 parts by mass was added.

After 0.5 hour of the aqueous surfactant solution addition, the pre-emulsion that a mixture of radical polymerizable monomers which is a component of a copolymer shown in "the second step" (an outer layer) in the following table 1, 21 parts by mass of deionized water, 6.7 parts by mass of CP-12Na and 0.115 part by mass of AMP-90 were emulsified dispersed in advance and the initiator solution of VA-061 0.1 part by mass/methanol 2 parts by mass/deionized water 3 parts by mass were titrated by 2 lines with 1.5 hours. When titrating, the inner temperature of the flask was maintained at 65° C., and after titration was finished, it was maintained at 65° C. for 1 hour. Further, it was maintained at 65° C. for 0.5 hour after addition of 0.63 part by mass of 28% aquaous ammonia.

Afterwards, it was cooled off to room temperature, and an aqueous coating material was obtained with adding 25 parts by mass (5 parts by mass in solid content) of "SNOWTEX O".

Further, the coating material was obtained with adding 5 parts by mass of butyl cellosolve as a film formation auxiliary.

A coating was prepared using the provided coating material, and transparency, water contact angle, anti-static property, carbon stain-resistance, outdoor exposure stain-resistance, weather resistance, water resistance and coating-elongation were tested. The results are shown in the following table 4.

Example 3

To a flask comprising an agitator, a reflux cooling pipe, a thermal control unit and a titration pump, 80 parts by mass of deionized water, 1.7 parts by mass of CP-12Na, 22 parts by mass (5 parts by mass in solid content) of SiEm, a mixture of the radical polymerizable monomer which was a component of a copolymer shown in the first step (an inner layer) of the following table 1 and 0.09 part by mass of "Perbutyl H69" (manufactured by NOF Corp.) was added. After having raised an inner temperature of a flask to 55° C., an aqueous reducing agent solution of ferrous sulfate 0.0002 part by mass/EDTA 0.0005 part by mass/Rongalite 0.05 part by mass/deionized water 1 part by mass was added. After 1 hour of addition of the aqueous reducing agent solution, confirmation at peak top temperature by exothermic of the polymerization and helding the inner temperature of a flask to 65° C., an aqueous surfactant solution of "EMULGEN 1150S-70" 1.43 parts by mass/ deionized water 1.9 parts by mass was added.

After 0.5 hour of the aqueous surfactant solution addition, the pre-emulsion that a mixture of the radical polymerizable monomers which is a component of a copolymer shown in "the second step" (an outer layer) in the following table 1, 21 parts by mass of deionized water, 6.7 parts by mass of CP-12Na and 0.115 part by mass of AMP-90 were emulsified dispersed in advance and the initiator solution of VA-061 0.1 part by mass/methanol 2 parts by mass/deionized water 3 parts by mass were titrated by 2 lines with 1.5 hours. When titrating, the inner temperature of the flask was maintained at 65° C., and after titration was finished, it was maintained at 65° C. for 1 hour. Further, it was maintained at 65° C. for 0.5 hour after addition of 0.63 part by mass of 28% aquaous ammonia Afterwards, it was cooled off to room temperature, and an aqueous coating material was obtained with adding 25 parts by mass (5 parts by mass in solid content) of "SNOWTEX O".

Further, the coating material was obtained with adding 5 parts by mass of butyl cellosolve as a film formation auxiliary.

A coating was prepared using the provided coating material, and transparency, water contact angle, anti-static property, carbon stain-resistance, outdoor exposure stain-resistance, weather resistance, water resistance, and coating-elongation were tested. The results are shown in the following table 4.

Examples 4-18, 21 and 22

Aqueous coating materials were provided as well as Example 3 except that kinds/contents of aqueous colloidal silica dispersions, components of copolymers shown in "the first step" (an inner layer) and components of copolymers shown in "the second step" (an outer layer) were changed as shown in table 1 or 2.

However, pH of the aqueous coating material about Examples 13 was 7 or less so that AMP-90 was further added and pH was adjusted 8.8.

Further, the coating materials were obtained with adding 5 parts by mass of butyl cellosolve as a film formation auxiliary.

However, defectiveness of the film formation occurred with adding of 5 parts of butyl cellosolve about examples 10, 11, 21 and 22, the coating materials were prepared with adding of 17 parts of butyl cellosolve.

Coatings were prepared using the provided coating materials, and transparency, water contact angle, anti-static property, carbon stain-resistance, outdoor exposure stain-resistance, weather resistance and water resistance were tested about Examples 4-7, 21 and 22, and transparency, water contact angle, anti-static property and carbon stain-resistance were tested about Examples 8-18. The results are shown in the following table 4.

Example 19

To a flask comprising an agitator, a reflux cooling pipe, a thermal control unit and a titration pump, 40 parts by mass of deionized water, 1.7 parts by mass of CP-12Na, 44 parts by mass (10 parts by mass in solid content) of SiEm, a mixture of the radical polymerizable monomer which was a component of a copolymer shown in the first step (an inner layer) of the following table 2 and 0.09 part by mass of Perbutyl H69 was added. After having raised an inner temperature of a flask to 55° C., an aqueous reducing agent solution of ferrous sulfate 0.0002 part by mass/EDTA 0.0005 part by mass/Rongalite 0.05 part by mass/deionized water 1 part by mass was added. After 1 hour of addition of the aqueous reducing agent solution, confirmation at peak top temperature by exothermic of the polymerization and helding the inner temperature of a flask to 65° C., an aqueous surfactant solution of "EMULGEN 1150S-70" 1.43 parts by mass/deionized water 1.9 parts by mass was added.

After 0.5 hour of the aqueous surfactant solution addition, the pre-emulsion that a mixture of the radical polymerizable monomers which is a component of the copolymer shown in "the second step" (an outer layer) in the following table 2, 21 parts by mass of deionized water, 6.7 parts by mass of CP-12Na and 0.115 part by mass of AMP-90 were emulsified dispersed in advance and the initiator solution of VA-061 0.1 part by mass/methanol 2 parts by mass/deionized water 3 parts by mass were titrated by 2 lines with 1.5 hours. When titrating, the inner temperature of the flask was maintained at 65° C., and after titration was finished, it was maintained at 65° C. for 1 hour. Further, it was maintained at 65° C. for 0.5 hour after addition of 0.63 part by mass of 28% aquaous ammonia Afterwards, it was cooled off to room temperature, and an aqueous coating material was obtained with adding 25 parts by mass (5 parts by mass with a solid content) of "SNOWTEX O".

Further, the coating material was obtained with adding 5 parts by mass of butyl cellosolve as a film formation auxiliary.

A coating was prepared using the provided coating material, and transparency, water contact angle, anti-static property, carbon stain-resistance, outdoor exposure stain-resistance, weather resistance and water resistance were tested. The results are shown in the following table 4.

Example 20

To a flask comprising an agitator, a reflux cooling pipe, a thermal control unit and a titration pump, 10 parts by mass of deionized water, 1.7 parts by mass of CP-12Na, 88 parts by mass (20 part by mass in solid content) of SiEm, a mixture of the radical polymerizable monomer which was a component of a copolymer shown in the first step (an inner layer) of the following table 2 and 0.09 part by mass of "Perbutyl H69" was added. After having raised an inner temperature of a flask to 55° C., an aqueous reducing agent solution of ferrous sulfate 0.0002 part by mass/EDTA 0.0005 part by mass/Rongalite 0.05 part by mass/deionized water 1 part by mass was added. After 1 hour of addition of the aqueous reducing agent solution, confirmation at peak top temperature by exothermic of the polymerization and helding the inner temperature of a flask to 65° C., an aqueous surfactant solution of "EMULGEN 1150S-70" 1.43 parts by mass/deionized water 1.9 parts by mass was added.

After 0.5 hour of the aqueous surfactant solution addition, the pre-emulsion that a mixture of the radical polymerizable monomers which is a component of a copolymer shown in "the second step" (an outer layer) in the following table 2, 21 parts by mass of deionized water, 6.7 parts by mass of CP-12Na and 0.115 part by mass of AMP-90 were emulsified dispersed in advance and the initiator solution of VA-061 0.1 part by mass/methanol 2 parts by mass/deionized water 3 parts by mass were titrated by 2 lines with 1.5 hours. When titrating, the inner temperature of the flask was maintained at 65° C., and after titration was finished, it was maintained at 65° C. for 1 hour. Further, it was maintained at 65° C. for 0.5 hour after addition of 0.63 part by mass of 28% aqueous ammonia.

Afterwards, it was cooled off to room temperature, and an aqueous coating material was obtained with adding 25 parts by mass (5 parts by mass in solid content) of "SNOWTEX O".

Further, the coating material was obtained with adding 5 parts by mass of butylcellosolve as a film formation auxiliary.

A coating was made using the provided coating material, and transparency, water contact angle, anti-static property, carbon stain-resistance, outdoor exposure stain-resistance, weather resistance and water resistance were tested. The results are shown in the following table 4.

Example 23

An aqueous coating material was prepared as well as Examples 22 and 5 parts by mass of ethanol was added.

Further, the coating material was obtained with adding 17 parts by mass of butylcellosolve as a film formation auxiliary.

A coating was prepared using the provided coating material, and transparency, water contact angle, anti-static property and carbon stain-resistance were tested. The results are shown in the following table 4.

Comparative Example 1 to 3

Aqueous coating materials were provided as well as Example 3 except that kinds/contents of aqueous colloidal silica dispersions were changed as shown in table 3.

Further, the coating materials were obtained with adding 5 parts by mass of butylcellosolve as a film formation auxiliary.

Coatings were prepared using the provided coating materials, and transparency, water contact angle, anti-static property, carbon stain-resistance, outdoor exposure stain-resistance and weather resistance were tested about Comparative examples 1 and 2, and transparency, water contact angle, anti-static property and carbon stain-resistance, outdoors exposure staining resistance, weather resistance, and coating elongation were tested about Comparative example 3. The results are shown in the following table 4.

Comparative Example 4

An aqueous coating material was provided as well as Example 3 except that a component of the copolymer shown in "the first step" (an inner layer) was changed as shown in table 3.

Further, the coating material was obtained with adding 5 parts by mass of butylcellosolve as a film formation auxiliary.

A coating was prepared using the provided coating material, and transparency, water contact angle, anti-static property, carbon stain-resistance, outdoor exposure stain-resistance, weather resistance, and water-resistance were tested. The result is shown in the following table 4.

TABLE 1

| | | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|
| Polymer (I) | SiEM (Solid content) | 5 | 5 | 5 | 5 | 5 | 5 | 10 | 20 | 5 | 5 | 5 |
| The first step (Inner layer) | MMA | 27.9 | — | — | 27.9 | 27.9 | 27.9 | 22.9 | 12.9 | 28 | 28 | 28 |
| | 2-HEMA | 2 | 2 | 2 | 2 | 2 | 2 | 2 | 2 | 2 | 2 | 2 |
| | EDMA | 0.1 | 0.1 | 0.1 | 0.1 | 0.1 | 0.1 | 0.1 | 0.1 | — | — | — |
| | t-BMA | — | 27.9 | — | — | — | — | — | — | — | — | — |
| | n-BA | — | — | 27.9 | — | — | — | — | — | — | — | — |
| The second step (Outer layer) | SZ-6030 | 4 | 2 | 2 | 2 | 2 | 2 | 2 | 2 | 5 | 5 | 5 |
| | MAA | 2 | 2 | 2 | 2 | 2 | 2 | 2 | 2 | 2 | 2 | 2 |
| | AA | 1.67 | — | — | — | — | — | — | — | — | — | — |
| | 2-HEMA | — | 2 | 2 | 2 | 2 | 2 | 2 | 2 | 2 | 2 | 2 |
| | n-BMA | 39.33 | 41 | 41 | 39 | — | 9 | 41 | 41 | 20 | 38 | 38 |
| | 2-EHA | 18 | 18 | 18 | — | 26 | — | 18 | 18 | 19 | 18 | 18 |
| | n-BA | — | — | — | 20 | — | — | — | — | — | — | — |
| | i-BMA | — | — | — | — | 33 | — | — | — | — | — | — |
| | 2-EHMA | — | — | — | — | — | 50 | — | — | — | — | — |
| | t-BMA | — | — | — | — | — | — | — | — | 17 | — | — |
| Colloidal silica (II) | SNOWTEX O (Solid content) | 5 | 5 | 5 | 5 | 5 | 5 | 5 | 5 | 5 | 5 | 5 |
| | SNOWTEX 20 (Solid content) | — | — | — | — | — | — | — | — | — | — | — |

TABLE 1-continued

|  |  |  | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|---|
| Surfactant | Anionic | SNOWTEX ZL (Solid content) | — | — | — | — | — | — | — | — | — | — | — |
|  |  | CP-12Na (Solid content) | 2.5 | 2.5 | 2.5 | 2.5 | 2.5 | 2.5 | 2.5 | 2.5 | — | — | — |
|  |  | SP-185Na (Solid content) | — | — | — | — | — | — | — | — | — | — | — |
|  |  | LATEMUL E-118B (Solid content) | — | — | — | — | — | — | — | — | 0.5 | 0.5 | 0.5 |
|  |  | ADEKA REASOAP SR-1025 (Solid content) | — | — | — | — | — | — | — | — | 2.5 | 2.5 | 2.5 |
|  | Non-ionic | EMULGEN 1150S-70 (Solid content) | 1 | 1 | 1 | 1 | 1 | 1 | 1 | 1 | — | — | — |
|  |  | EMULGEN 1135S-70 (Solid content) | — | — | — | — | — | — | — | — | — | — | — |
| Organic solvent |  | ethanol | — | — | — | — | — | — | — | — | — | — | 5 |

TABLE 2

|  |  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|---|
| Polymer (I) | SiEM (Solid content) |  | — | 0.9 | 5 | 5 | 5 | 5 | 5 | 5 | 5 | 5 | 5 | 5 |
|  | The first step (Inner layer) | MMA | 32.9 | 32 | 27.9 | 27.9 | 27.9 | 27.9 | 27.9 | 27.9 | 27.9 | 27.9 | 27.9 | 27.9 |
|  |  | 2-HEMA | 2 | 2 | 2 | 2 | 2 | 2 | 2 | 2 | 2 | 2 | 2 | 2 |
|  |  | EDMA | 0.1 | 0.1 | 0.1 | 0.1 | 0.1 | 0.1 | 0.1 | 0.1 | 0.1 | 0.1 | 0.1 | 0.1 |
|  |  | t-BMA | — | — | — | — | — | — | — | — | — | — | — | — |
|  |  | n-BA | — | — | — | — | — | — | — | — | — | — | — | — |
|  | The second step (Outer layer) | SZ-6030 | 2 | 2 | 2 | 2 | 2 | 2 | 2 | 0.5 | 1 | 5 | 5 | 2 |
|  |  | MAA | 2 | 2 | 2 | 2 | 2 | 2 | 2 | 2 | 2 | 2 | 2 | 2 |
|  |  | AA | — | — | — | — | — | — | — | — | — | — | — | — |
|  |  | 2-HEMA | 2 | 2 | 2 | 2 | 2 | 2 | 2 | 2 | 2 | 2 | 2 | 2 |
|  |  | n-BMA | 41 | 41 | 41 | 41 | 41 | 41 | 41 | 42.5 | 42 | 38 | 38 | 41 |
|  |  | 2-EHA | 18 | 18 | 18 | 18 | 18 | 18 | 18 | 18 | 18 | 18 | 18 | 18 |
|  |  | n-BA | — | — | — | — | — | — | — | — | — | — | — | — |
|  |  | i-BMA | — | — | — | — | — | — | — | — | — | — | — | — |
|  |  | 2-EHMA | — | — | — | — | — | — | — | — | — | — | — | — |
|  |  | t-BMA | — | — | — | — | — | — | — | — | — | — | — | — |
| Colloidal silica (II) |  | SNOWTEX O (Solid content) | 5 | 5 | 5 | — | 2.5 | 10 | 20 | 5 | 5 | 5 | 5 | 5 |
|  |  | SNOWTEX 20 (Solid content) | — | — | — | 5 | — | — | — | — | — | — | — | — |
|  |  | SNOWTEX ZL (Solid content) | — | — | — | — | — | — | — | — | — | — | — | — |
| Surfactant | Anionic | CP-12Na (Solid content) | 2.75 | 2.75 | 2.5 | 2.5 | 2.5 | 2.5 | 2.5 | 2.5 | 2.5 | 2.5 | 2.5 | — |
|  |  | SP-185Na (Solid content) | — | — | — | — | — | — | — | — | — | — | — | 2.5 |
|  |  | LATEMUL E-118B (Solid content) | — | — | — | — | — | — | — | — | — | — | — | — |
|  |  | ADEKA REASOAP SR-1025 (Solid content) | — | — | — | — | — | — | — | — | — | — | — | — |
|  | Nonionic | EMULGEN 1150S-70 (Solid content) | 1 | 1 | 1 | 1 | 1 | 1 | 1 | 1 | 1 | — | 1 | 1 |
|  |  | EMULGEN 1135S-70 (Solid content) | — | — | — | — | — | — | — | — | — | 1 | — | — |
| Organic solvent |  | ethanol | — | — | — | — | — | — | — | — | — | — | — | — |

TABLE 3

|  |  |  | Comparative example 1 | Comparative example 2 | Comparative example 3 | Comparative example 4 |
|---|---|---|---|---|---|---|
| Polymer (I) | SiEM (Solid content) |  | 5 | 5 | 5 | 5 |
|  | The first step (Inner layer) | MMA | 27.9 | 27.9 | 27.9 | 27.9 |
|  |  | 2-HEMA | 2 | 2 | 2 | 2 |
|  |  | EDMA | 0.1 | 0.1 | 0.1 | 0.1 |
|  |  | t-BMA | — | — | — | — |
|  |  | n-BA | — | — | — | — |
|  | The second step (Outer layer) | SZ-6030 | 2 | 2 | 2 | — |
|  |  | MAA | 2 | 2 | 2 | 2 |
|  |  | AA | — | — | — | — |
|  |  | 2-HEMA | 2 | 2 | 2 | 2 |
|  |  | n-BMA | 41 | 41 | 41 | 43 |
|  |  | 2-EHA | 18 | 18 | 18 | 18 |
|  |  | n-BA | — | — | — | — |
|  |  | i-BMA | — | — | — | — |
|  |  | 2-EHMA | — | — | — | — |
|  |  | t-BMA | — | — | — | — |
| Colloidal silica (II) | SNOWTEX O (Solid content) |  | — | — | 30 | 5 |
|  | SNOWTEX 20 (Solid content) |  | — | — | — | — |
|  | SNOWTEX ZL (Solid content) |  | — | 5 | — | — |
| Surfactant | Anionic | CP-12Na (Solid content) | 2.5 | 2.5 | 2.5 | 2.5 |
|  |  | SP-185Na (Solid content) | — | — | — | — |
|  |  | LATEMUL E-118B (Solid content) | — | — | — | — |
|  |  | ADEKA REASOAP SR-1025 (Solid content) | — | — | — | — |
|  | Nonionic | EMULGEN 1150S-70 (Solid content) | 1 | 1 | 1 | 1 |
|  |  | EMULGEN 1135S-70 (Solid content) | — | — | — | — |
| Organic solvent | ethanol |  | — | — | — | — |

TABLE 4

|  | Coating Property | | Testing results | | | | | | |
|---|---|---|---|---|---|---|---|---|---|
|  |  |  | Water contact angle (degree) | Anti-static property | Carbon stain-resistance | Outdoor exposure stain-resistance | | Weather resistance | |
|  | Ocupied areas of Colloidal silica of coating surface (%) | Transparency |  |  |  | Upper surface | Perpendicular surface | 96 hours | 192 hours |
| Ex 1 | 83 | ○ | 36 | ◉ | ◉ | ◉ | ◉ | ◉ | ◉ |
| Ex 2 | 82 | ○ | 38 | ◉ | ◉ | ◉ | ◉ | ◉ | ○ |
| Ex 3 | 96 | ○ | 25 | ◉ | ◉ | ◉ | ◉ | ◉ | ◉ |
| Ex 4 | 91 | ○ | 27 | ◉ | ○ | ◉ | ◉ | ◉ | ◉ |
| Ex 5 | 97 | ○ | 21 | ◉ | ◉ | ◉ | ◉ | ◉ | ◉ |
| Ex 6 | 85 | ○ | 34 | ◉ | ◉ | ◉ | ◉ | ◉ | ◉ |
| Ex 7 | 84 | Δ | 35 | ◉ | ◉ | ◉ | ◉ | ◉ | ◉ |
| Ex 8 | 63 | ○ | 60 | Δ | Δ | Δ | ○ | — | — |
| Ex 9 | 74 | ○ | 49 | ○ | Δ | ○ | ○ | — | — |
| Ex 10 | 96 | ○ | 24 | ◉ | ◉ | ◉ | ◉ | — | — |
| Ex 11 | 99 | ○ | 5 | ◉ | ◉ | ◉ | ◉ | — | — |
| Ex 12 | 96 | ○ | 24 | ◉ | ○ | ◉ | ◉ | — | — |
| Ex 13 | 98 | ○ | 11 | ◉ | ◉ | ◉ | ◉ | — | — |
| Ex 14 | 74 | ○ | 50 | ○ | ○ | ○ | ○ | — | — |
| Ex 15 | 96 | ○ | 23 | ◉ | Δ | ○ | ○ | — | — |
| Ex 16 | 97 | ○ | 16 | ◉ | ◉ | ◉ | ◉ | — | — |
| Ex 17 | 97 | ○ | 22 | ◉ | ◉ | ◉ | ◉ | — | — |
| Ex 18 | 83 | ○ | 37 | ◉ | ◉ | ○ | ○ | — | — |
| Ex 19 | 82 | ○ | 38 | ◉ | ◉ | ○ | ○ | ◉ | ○ |
| Ex 20 | 59 | ○ | 69 | Δ | Δ | Δ | ○ | ◉ | ◉ |
| Ex 21 | 65 | ○ | 58 | Δ | Δ | ○ | ○ | ◉ | ◉ |
| Ex 22 | 62 | ○ | 63 | Δ | Δ | ○ | ○ | ◉ | ◉ |
| Ex 23 | 75 | ○ | 48 | ○ | ○ | ○ | ◉ | — | — |
| Com. Ex 1 | 0 | ○ | 93 | X | X | X | X | ◉ | ◉ |
| Com. Ex 2 | 24 | ○ | 80 | X | X | X | X | ○ | Δ |
| Com. Ex 3 | 99 | X | 25 | ◉ | ◉ | ◉ | ◉ | ○ | ○ |
| Com. Ex 4 | 15 | ○ | 100 | X | X | X | X | ◉ | ○ |

TABLE 4-continued

| | | Coating Property | Testing results | | | | |
| --- | --- | --- | --- | --- | --- | --- | --- |
| | | Ocupied areas of Colloidal silica of coating surface (%) | Weather resistance | | | Water resistance | Coating-elongation (%) |
| | | | 288 hours | 384 hours | 480 hours | | |
| | Ex 1 | 83 | ◉ | ◉ | ◉ | ○ | — |
| | Ex 2 | 82 | ○ | ○ | ○ | ◉ | 55 |
| | Ex 3 | 96 | ◉ | ◉ | ◉ | ◉ | 57 |
| | Ex 4 | 91 | ◉ | ◉ | ○ | ◉ | — |
| | Ex 5 | 97 | ◉ | ◉ | ◉ | ◉ | — |
| | Ex 6 | 85 | ◉ | Δ | Δ | ◉ | — |
| | Ex 7 | 84 | ◉ | Δ | Δ | ○ | — |
| | Ex 8 | 63 | — | — | — | — | — |
| | Ex 9 | 74 | — | — | — | — | — |
| | Ex 10 | 96 | — | — | — | — | — |
| | Ex 11 | 99 | — | — | — | — | — |
| | Ex 12 | 96 | — | — | — | — | — |
| | Ex 13 | 98 | — | — | — | — | — |
| | Ex 14 | 74 | — | — | — | — | — |
| | Ex 15 | 96 | — | — | — | — | — |
| | Ex 16 | 97 | — | — | — | — | — |
| | Ex 17 | 97 | — | — | — | — | — |
| | Ex 18 | 83 | — | — | — | — | — |
| | Ex 19 | 82 | ○ | ○ | Δ | ◉ | — |
| | Ex 20 | 59 | ○ | ○ | ○ | ◉ | — |
| | Ex 21 | 65 | ◉ | ◉ | ◉ | ◉ | — |
| | Ex 22 | 62 | ◉ | ○ | ○ | ◉ | — |
| | Ex 23 | 75 | — | — | — | — | — |
| | Com. Ex 1 | 0 | ◉ | ◉ | ○ | ◉ | — |
| | Com. Ex 2 | 24 | Δ | Δ | Δ | ◉ | — |
| | Com. Ex 3 | 99 | X*1 | X*2 | — | ○ | 19 |
| | Com. Ex 4 | 15 | X | Δ | X | X | — |

*1 Partially peeling
*2 Full peeling

Abbreviations during Table 1 or 2 show compounds of the following.
MMA: methyl methacrylate
2-HEMA: 2-hydroxyethyl methacrylate
EDMA: ethylene glycol dimethacrylate
t-BMA: tert-butyl methacylate
n-BA: n-butyl acrylate
St: styrene
"SZ-6030": γ-methacryloyloxypropyl trimethoxy silane (manufactured by Dow Corning Toray Co., Ltd.)
MAA: methacrylic acid
AA: acrylic acid
n-BMA: n-butyl methacrylate
2-EHA: 2-ethylhexyl acrylate
i-BMA: isobutyl methacylate
2-EHMA: 2-ethylhexyl methacrylate
"SNOWTEX O": (Trade name, manufactured by Nissan Chemical Industries, Ltd., particle size of 10-20 nm)
"SNOWTEX 20": (Trade name, manufactured by Nissan Chemical Industries, Ltd., particle size of 10-20 nm)
"SNOWTEX ZL": (Trade name, manufactured by Nissan Chemical Industries, Ltd., particle size of 70-100 nm)
"CP-12Na": (Trade name, manufactured by Toho Chemical Industry Co., Ltd.)
"SP-185FNa": (Trade name, manufactured by Toho Chemical Industry Co., Ltd.)
"LATEMUL E-118B": (Trade name, manufactured by Kao Corporation)
"ADEKA REASOAP SR-1025": (Trade name, manufactured by Adeka Corp.)
"EMULGEN 1150S-70": (Trade name, manufactured by Kao Corporation)
"EMULGEN 1135S-70": (Trade name, manufactured by Kao Corporation)

As apparent from table 4, the coatings of Examples are excellent in water contact angle and anti-static property so that they are excellent in stain-resistance (carbon decontamination property and outdoor exposure stain-resistance) and also have high transparency, weather resistance, water resistance and coating-elongation. On the contrary, the coatings of Comparative examples are inferior to property balance of stain-resistant, transparency, weather resistance, water resistance and coating-elongation. In particular, as the coatings of Comparative examples 1, 2 and 4, the areas of colloidal silica that were exposed to the coating surfaces become small, and stain-resistances are of low levels.

INDUSTRIAL APPLICABILITY

The coating of the present invention is suitable for the painting to the products which in particular high stain-resistance, transparency, weather resistance, water resistance, and coating-elongation are required.

The invention claimed is:
1. A coating comprising:
   a coating component comprising a polymer consisting of 10 parts by mass or less of a polymer block (A) having a repetitive unit of dimethyl siloxane, a polymer block (B) having a repetitive unit of radical polymerizable monomers, and 1 to 20 parts by mass of a silicon-containing graft-linking unit (C) which is copolymerized to polymer block (A) and polymer block (B), the total amount of polymer blocks (A), (B) and (C) is 100 parts by mass;
   at least one kind of an anionic surfactant comprising a sulfate salt of polyoxyalkylene aryl ether, a sulfate salt of polyoxyalkylene alkylaryl ether, a formalin condensate of a sulfate salt of polyoxyalkylene aryl ether, or a for- malin condensate of a sulfate salt of polyoxyalkylene alkylaryl ether, or mixtures thereof;

a nonionic surfactant having the number of the repetitive unit of polyoxyethylene of 10 or more; and colloidal silica having an average particle size of 60 nm or less, wherein the colloidal silica is 0.5 to 20 parts by mass in solid form for 100 parts by mass of the polymer, and an area of the colloidal silica exposed at a coating surface occupies 70% or more of the coating surface.

2. An aqueous coating material for the coating according to claim 1.

3. The aqueous coating material according to claim 2, comprising: 0.5 to 20 parts by mass of an organic solvent having less than 0.8 of distribution coefficient of octanol/water for 100 parts by mass of the polymer.

4. An aqueous coating material comprising:

a polymer consisting of 10 parts by mass or less of a polymer block (A) having a repetitive unit of dimethyl siloxane, a polymer block (B) having a repetitive unit of radical polymerizable monomers, and 1 to 20 parts by mass of a silicon-containing graft-linking unit (C) which is copolymerized to polymer block (A) and polymer block (B), the total amount of polymer blocks (A), (B) and (C) is 100 parts by mass;

at least one kind of an anionic surfactant comprising a sulfate salt of polyoxyalkylene aryl ether, a sulfate salt of polyoxyalkylene alkylaryl ether, a formalin condensate of a sulfate salt of polyoxyalkylene aryl ether, or a formalin condensate of a sulfate salt of polyoxyalkylene alkylaryl ether, or mixtures thereof;

a nonionic surfactant having the number of the repetitive unit of polyoxyethylene of 10 or more; and colloidal silica having an average particle size of 60 nm or less, wherein the colloidal silica is 0.5 to 20 parts by mass in solid form for 100 parts by mass of the polymer.

5. A coated article comprising the coating according to claim 1.

6. A process for producing a coating, comprising; applying the aqueous coating according to any one of claims 4 to 3.

7. The aqueous coating material according to claim 4, comprising: 0.5 to 20 parts by mass of an organic solvent having less than 0.8 of a distribution coefficient of octanol/water for 100 parts by mass of the polymer.

8. A coating comprising the aqueous coating material according to claim 4.

* * * * *